US006484235B1

(12) United States Patent
Horst et al.

(10) Patent No.: US 6,484,235 B1
(45) Date of Patent: Nov. 19, 2002

(54) METHODS AND SYSTEMS FOR DYNAMICALLY DISTRIBUTING DISK ARRAY DATA ACCESSES

(75) Inventors: Robert W. Horst, Saratoga, CA (US); William J. Alessi, San Francisco, CA (US); James A. McDonald, Palo Alto, CA (US); Rod S. Thompson, Sunnyvale, CA (US)

(73) Assignee: 3Ware, Inc., Mountain View, CA (US)

( * ) Notice: Subject to any disclaimer, the term of this patent is extended or adjusted under 35 U.S.C. 154(b) by 0 days.

(21) Appl. No.: 09/391,826

(22) Filed: Sep. 8, 1999

Related U.S. Application Data

(60) Provisional application No. 60/132,298, filed on May 3, 1999, and provisional application No. 60/144,573, filed on Jul. 19, 1999.

(51) Int. Cl.[7] .......... G06F 12/02
(52) U.S. Cl. .......... 711/114
(58) Field of Search .......... 711/114, 157, 711/153, 162, 168, 173, 112; 714/6, 11

(56) References Cited

U.S. PATENT DOCUMENTS 5,517,632 A 5/1996 Matsumoto et al.
5,742,443 A 4/1998 Tsao et al.
5,745,915 A 4/1998 Cooper et al.
5,909,693 A 6/1999 Martini
6,115,788 A 9/2000 Thowe
6,134,586 A 10/2000 Walker
6,138,221 A 10/2000 Korst et al.
6,223,251 B1 * 4/2001 Nemoto .......... 711/114
6,311,193 B1 10/2001 Sekido
6,327,638 B1 * 12/2001 Kirby .......... 711/4

* cited by examiner

*Primary Examiner*—Hiep T. Nguyen
(74) *Attorney, Agent, or Firm*—Knobbe, Martens, Olson & Bear, LLP

(57) ABSTRACT

The present invention is related to methods and systems for reducing head movements during accesses to drives within a drive array by dynamically selecting which one of a first drive and a second drive is to be used to read data stored within a first logical address range. A first set of data is stored in both the first drive and the second drive. The logical block addresses accessed by at least a portion of read operations are monitored. The first drive is designated as a data source for data stored on both the first drive and the second drive in the first logical address range. The second drive is designated as a data source for data stored on both the first drive and the second drive outside the first logical address range. The designation of drives is performed at least partly in response to the monitoring act.

5 Claims, 25 Drawing Sheets

100
DRIVE 1 122
DRIVE 2 124
DRIVE N 126
112
116 118 120 ARRAY CONTROLLER
128 130 132
CONTROLLER 1
CONTROLLER 2
CONTROLLER N
102
HOST PC
110
HOST BUS (PCI)
106
104
SYSTEM MEMORY
DEVICE DRIVER 108
HOST μP

| Zone | BeginLBA | StripeSize |
|---|---|---|
| 1 | 0 | $\alpha$ sectors |
| 2 | LBA1 | $\beta$ sectors |
| • • • | • • • | • • • |
| n | LBA_n | $\psi$ sectors |

FIG. 5A

| Zone | BeginLBA | StripeSize FOR ReadSize x | StripeSize FOR ReadSize y | StripeSize FOR ReadSize z |
|---|---|---|---|---|
| 1 | 0 | $\alpha$ sectors | $\alpha'$ sectors | $\alpha''$ sectors |
| 2 | LBA | $\beta$ sectors | $\beta'$ sectors | $\beta''$ sectors |
| ⋮ | ⋮ | ⋮ | ⋮ | ⋮ |
| n | LBA n | $\psi$ sectors | $\psi'$ sectors | $\psi''$ sectors |

| Zone | BeginLBA | BlockSize | StripeSize |
|---|---|---|---|
| 1 | 0 | $\alpha$ sectors | $\alpha'$ sectors |
| 2 | LBA | $\beta$ sectors | $\beta'$ sectors |
| ... | ... | ... | ... |
| n | LBA n | $\psi$ sectors | $\psi'$ sectors |

```
/* Find desired block size to use when reading a disk
backwards.  Repeat for 500 different stripe sizes. */


Get StartingLBA from command line


MeasureStripe
    For Block = 2 LBAs to 1000 LBAs by 2
      Start timer
      AVRead (Block)
      Stop timer
      Print block size and timer


AVRead (block)
  i = StartingLBA
  While i > 0
    Read from i-block to i
    i = i-block
```

| Zone | BeginLBA | RevBlockSize |
|---|---|---|
| 1 | 0 | $\alpha$ sectors |
| 2 | LBA1 | $\beta$ sectors |
| ⋮ | ⋮ | ⋮ |
| n | LBA_n | $\psi$ sectors |

```
Remap LBA's for reverse access
NegLBA = MaxLBA - ReqLBA /* Renumber from inside to outside LBA */
Zonebreak() /*If request crosses a zone, queue as seperate I/Os*/
Block = ZoneTable(NegLBA). RevBlockSize /*find Blocksize in Zone table */
BlockNum = Integer(NegLBA)/Block
Offset = Block - (NegLBA mod Block) - 1
RemappedLBA = BlockNum^Offset
```

FIG. 20B

2200
SUSTAINED PERFORMANCE vs TIME
TOTAL
DRIVE A
DRIVE B
2206
2204
2202
MB/s
35
30
25
20
15
10
5
0
ELAPSED TIME (MINUTES)

METHODS AND SYSTEMS FOR DYNAMICALLY DISTRIBUTING DISK ARRAY DATA ACCESSES

The subject matter of U.S. patent application Ser. Nos. 09/392,363, 09/392,364 and 09/392,358, which were filed on Sep. 8, 1999, is related to this application.

The present application claims priority from U.S. Provisional Patent Application No. 60/132,298 filed on May 3, 1999, and from U.S. Provisional Patent Application No. 60/144,573 filed on Jul. 19, 1999. The contents of those applications, in their entirety, are hereby incorporated by reference.

BACKGROUND OF THE INVENTION

1. Field of the Invention

The present invention is generally directed to data storage, and in particular to methods and systems for storage arrays.

2. Description of the Related Art

Various versions of RAID (redundant array of inexpensive disk drives) systems are conventionally used to provide reliable data storage, high-speed access, or both high speed access with high reliability.

Disk striping of two drives, also called RAID 0, places even blocks of data on one drive and odd blocks on another drive. Thus, half the data is stored on a first drive, and half the data is stored on a second drive. For read and write transfers longer than a few blocks, bandwidth is improved by accessing both disks simultaneously. One significant disadvantage of standard RAID 0 striping is that reliability is worse than a single drive, because a failure of either drive leaves no complete copy of any of the files.

RAID 1, also known as mirrored disks or shadow sets, uses a pair of disks with identical copies of data. Mirrored disks provide high reliability, in that if one of the two disks fail, the remaining disk contains a duplicate of the data on the failed disk. However, while mirrored disks provide high reliability, conventionally, they have not provided increased bandwidth.

RAID 5 is a technique in which more than two drives are used to provide a way to recover from a drive failure. For each block of data, the parity of N−1 blocks is computed and stored on the Nth drive. Drawbacks of this technique are that it cannot be used with only two drives, it greatly decreases write performance, and it does not improve sequential read performance.

SUMMARY OF THE INVENTION

The present invention relates to accessing data, and in particular, to accessing data from mass storage devices using striping.

One embodiment of the present invention utilizes a novel disk architecture that takes advantage of data redundancy to provide greatly enhanced sequential disk I/O performance. One aspect of the present invention is a system and method which associates at least two different stripe sizes with at least two corresponding different portions of a disk drive. In one embodiment, at least a first disk zone and a second disk zone are accessed using different stripe sizes. In another embodiment, the first zone has a different number of sectors than the second zone.

In one embodiment, the stripe size used to access the first zone is selected based on formatting information. The formatting information may be obtained, by way of example, either by scanning the disk or by reading formatting information from a table of the like. The stripe size may be related to the number of sectors per track in the first zone. In addition, the stripe size may be related to a sector skew. In another embodiment, the stripe size for at least one zone is selected based on at least the sector skew between disk tracks in the zone, and the number of sectors per zone.

In still another embodiment, a first set of data is stored on at least both a first disk drive and a second disk drive. A first stripe of the data set is read from the first drive, and a second stripe of the data set is read from the second drive. In one embodiment, the accesses to the first disk drive and the second disk drive are balanced. Thus, in one embodiment, a system monitors which logical block addresses are accessed by a plurality of read operations accessing at least one of a first portion and a second portion of a first set of data. The system then specifies the first drive as the future source of data for at least one read request to the first set of logical block addresses, based at least in part on the monitoring act. The system further specifies the second drive as the future source of data for at least one read request to the second set of logical block addresses, based at least in part on the monitoring act. In still another embodiment, the selections of the first and the second sets of logical address blocks are intended to substantially equalize the number of read requests handled by the first drive and the second drive.

In one embodiment, mirrored data may be arranged and ordered to enhance I/O operations. For example, a set of data may be stored on a first disk in a first arrangement, and the same set of data may be stored on a second disk in a second order. One aspect of the present invention includes arranging at least a portion of the data set stored on the second disk in a different arrangement or order as compared to the order the data set portion on the first disk. Thus, in one embodiment, even blocks of the data set may be stored on the outer portion of the first disk, and odd blocks of the data set may be stored on the inner portion of the first disk. In addition, odd blocks of the data set may be stored on the outer portion of the second disk and even blocks of the data set may be stored on the inner portion of the second disk. Even and odd blocks of the data set may be read from the corresponding outer portions of the first and the second disks. Thus, in one embodiment, when reading the data set, it is not necessary to perform seeks to the inner portions of the first and the second disks, thereby speeding access times.

Another embodiment of the present invention may be configured to provide constant rate disk streaming using the variable striping technique. Constant rate variable streaming provides significant advantages for multimedia applications, such as audio and video applications. For example, one embodiment of the present invention helps maintain a desired frame rate for video applications and ensures that the frame rate does not fall below a minimum desired rate.

In one embodiment data is advantageously arranged to allow the array to supply data at a substantially constant data rate and at or above a minimum desired data rate. In one embodiment data is striped across 2 or more drives, with the stripe size varied so that the stripe size is larger at the outer diameter (OD) and smaller at the inner diameter (ID). Drives in one subset of the array drives are accessed sequentially in the conventional fashion from the outer diameter to the inner diameter. Drives in another subset of the array drives are accessed from ID to OD using a novel method that uses knowledge of the track size.

BRIEF DESCRIPTION OF THE DRAWINGS

FIG. 5A illustrates a first embodiment of a zone table;

FIG. 5B illustrates a second embodiment of a zone table;

FIG. 14 illustrates one embodiment of a zone table that may be used with a RAID 5-type array;

FIG. 19 illustrates one embodiment of a disk profiling algorithm;

FIG. 20A illustrates an embodiment of a zone table;

FIG. 20B illustrates an embodiment of a disk remapping algorithm;

DETAILED DESCRIPTION OF THE PREFERRED EMBODIMENTS

The present invention is generally directed to data storage, and in particular to methods and systems for storage arrays that advantageously provide both reliable data storage and enhanced performance.

Figure 1:
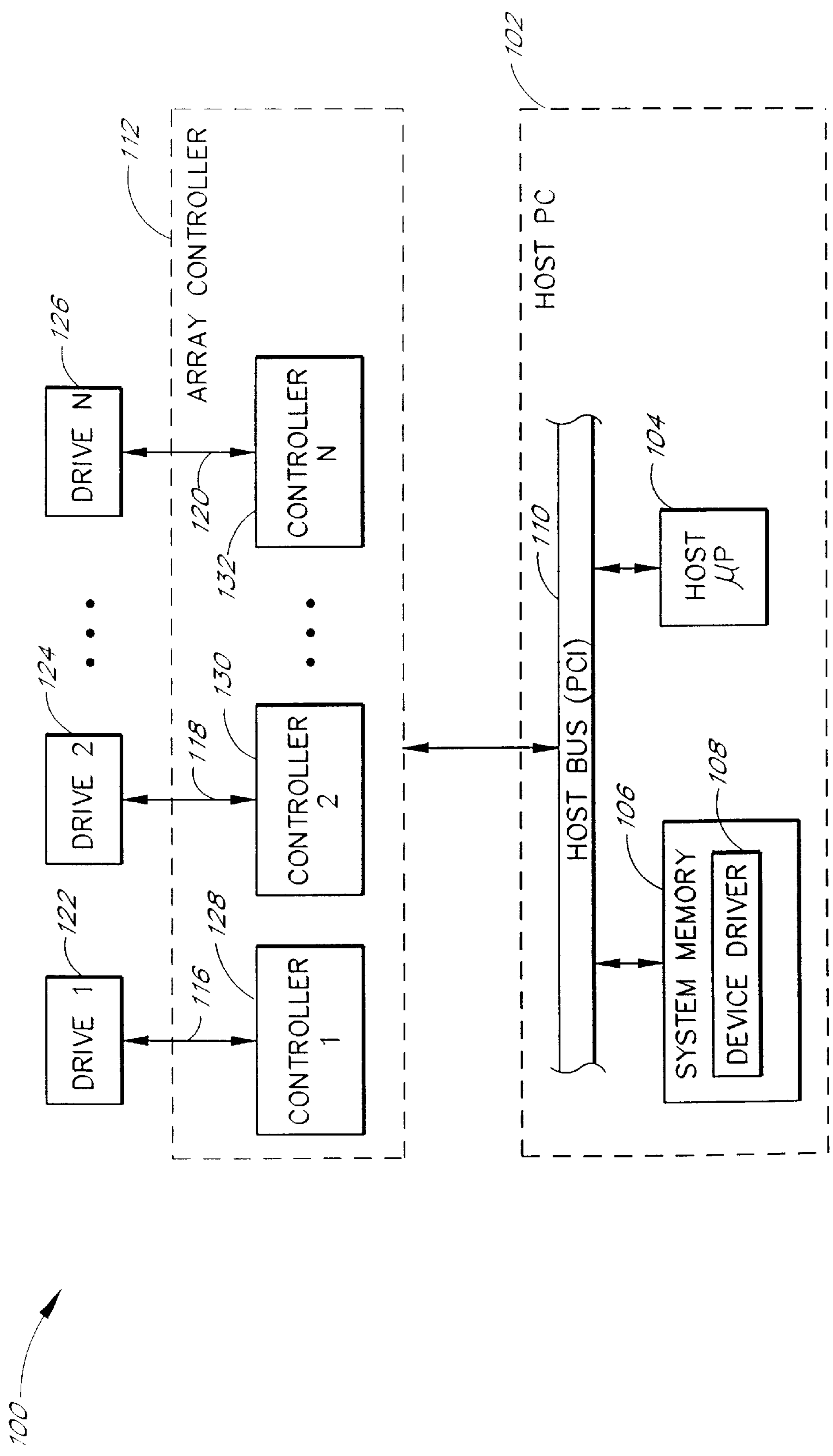
FIG. 1 illustrates a system that may be used with one embodiment of the present invention.

FIG. 1 illustrates a typical system 100 that may be used with one embodiment of the present invention. A host computer 102, such as a personal computer, has a host microprocessor 104 and system memory 106. Upon boot-up, the system memory 106 may contain one or more device drivers 108, such as mass storage-related drivers. The system memory 106 and the host microprocessor 104 may be coupled to a host bus 110, which may be, by way of example, a PCI-compatible bus. A disk array controller card 112 may also be coupled to the host bus 110. The array controller card 112 may contain one or more mass storage controller circuits 128, 130, 132, which are in turn coupled to mass storage devices 122, 124, 126 by I/O buses 116, 118, 120. The I/O buses may be, by way of example, SCSI or ATA buses. In addition, each of the buses 116, 118, 120 may optionally be connected to more than one storage device. In one embodiment, the mass storage devices 122, 124, 126 may be magnetic disc drives, also known as hard disk drives. In another embodiment, optical drives, or other storage technologies may be used.

Input/output (I/O) requests are communicated from the host microprocessor 104, executing the device driver 108, to the array controller via the host bus 110. The array controller 112 translates the I/O requests into disk commands based on the particular array configuration, such as RAID 1 mirrored drives, and provides the translated commands to the mass storage controller circuits 128, 130, 132. The mass storage controller circuits 128, 130, 132, in-turn, handle data transfers to and from the mass storage devices 122, 124, 126. While the system 100 illustrated in FIG. 1 has an N number of drives which may be used for mirroring, in a conventional RAID 1 configuration, only two drives might be used.

Conventional data storage disks, including optical and magnetic disks, utilize "tracks" to store data. Each disk platter may have thousands of tracks. The tracks may be concentric, as on conventional magnetic disks and some optical disks. On a disk, tracks are longer, having a larger circumference, near the outer disk diameter, and shorter nearer the inner disk diameter. Generally, disks may be formatted into zones. Each track within a given zone may have the substantially the same number of sectors. However, outer zones may have more sectors per track than the inner zones. Due to occasional defective sectors, the number of sectors per track within a zone is not identical, but may vary by a few sectors. Typical disks today may have several hundred's of 512-byte sectors per track, though future disks may have many more sectors per track.

Disk drives typically contain several read/write heads. The heads are mounted onto arms that allow the heads to be moved from inner to outer tracks and from outer to inner tracks. The arms are moved using a head actuator, such as a voice coil or the like. Conventionally, after a disk track is read, some time is needed to seek to the next track or to switch to a different read/write head. To accommodate the seek time or head switch time, the end of one track and beginning of the next track may be formatted with some skew to put the next sequential data under the head just after the seek or head switch is completed. With current drives, the skew may be approximately ¼ turn of the disk. For the following discussion, we will assume that the skew is ¼ turn, although the current invention does not require any particular skew.

Figure 2:
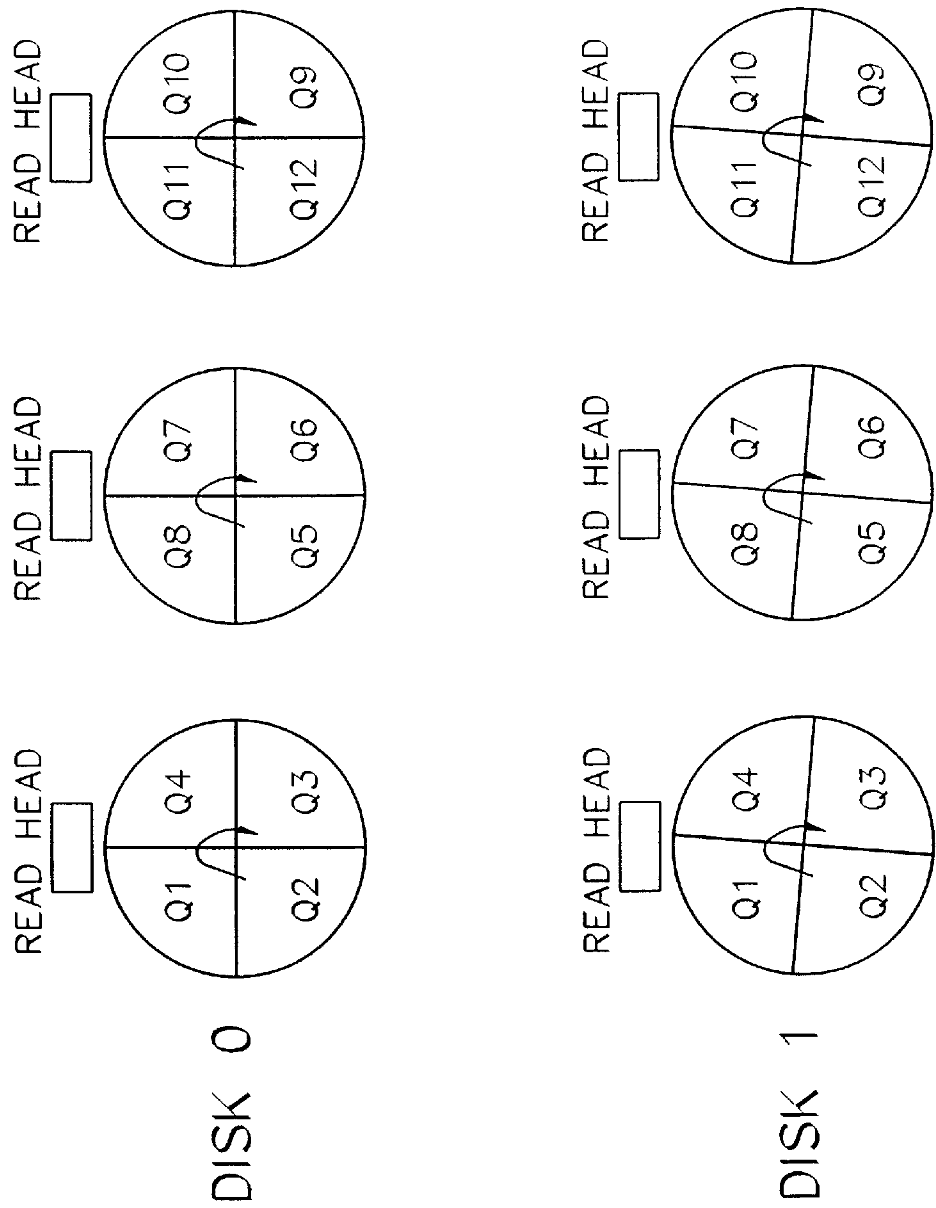
FIG. 2 illustrates an exemplary data layout for a first disk drive and a second disk drive.

FIG. 2 illustrates an exemplary data layout for two disk drives, Drives 0 and 1. Each drive may have one or more platters. For illustrative purposes, the data is divided into quadrants, with some number of sectors per quadrant. Note that one embodiment the two drives may rotate at slightly different rates, and the rotations do not need to be phase-locked in order to take advantage of this invention. As described below, in another embodiment, the rotation rates of the drives may be completely unrelated.

For the embodiment illustrated in FIG. 2, the progression of data past the heads shows, by way of example, that a sequential read of the sectors in quadrants 4 and 5 incurs and extra delay for a head switch or sequential seek, and that another quadrant (such as Q8) is under the read heads during this time.

In many RAID 1 architectures, which typically include two mirrored disks, each I/O operation is conventionally directed to only one of the disks. In addition, conventional RAID 1 systems disadvantageously read data using fixed-length stripes for all zones. Thus, the presence of two mirrored disks does not provide any performance improvement for a single sequential transfer. For example, with a stripe size of 8 Kbytes, if disk 0 reads even 8 Kbytes stripes and disk 1 reads odd 8 Kbytes stripes, both disks transfer half the time and spend the other half of the time waiting for the head to pass over data being read by the other drive.

In contrast to the conventional mirrored systems described above, one embodiment of the present invention utilizes the ability of disk drives to skip over data quickly when moving the head from one track to another track. By skipping ahead quickly, the head spends very little time waiting while the head is passing over data being transferred by the other drive. Thus, if the stripe size is increased to or past the point where the amount of data being skipped is equal to one track, the data transfer rate increases sharply, because little time is wasted for the head to pass over data being transferred by the other drive.

In one embodiment, a disk drive is initially profiled to determine preferred, optimal, or near-optimal stripe sizes to use within different zones. An "optimal" stripe size is one which substantially reduces or minimizes the delay caused by rotational latency as the drive switches from one stripe to the next during an I/O read, as described below. The set of optimal or near-optimal stripe sizes may depend upon the physical characteristics of the disk drive, including how the drive is formatted, seek times, the head switch time, and/or the number of drives to be included in the array. The results of the profiling process may be stored within a table or the like that maps logical block addresses (LBAs) to stripe sizes. This table may, for example, be stored on the disk or in other types of non-volatile memory, and read into the controller's volatile memory, or RAM, at boot-up.

In practice, it may not be necessary to separately profile each disk drive, as the set of optimal stripe sizes will often remain static for a given disk drive manufacturer and model. The appropriate table can therefore be selected from a pre-loaded data file provided as part of a host program. The data file may be copied to the disk during configuration of one or more of the array drives. The correct data file may be selected by a host utility program executing on the host system 102, which scans each disk, reads a manufacturers information file, and/or prompts the user for the manufacturer and model information, to thereby select the data file. In another embodiment, the drive manufacturer provides the information used to determine the preferred stripe size.

As described below, the information stored within the table is used by an array read algorithm to select appropriate stripe sizes to be used on read operations. In one embodiment, the read algorithm, as well as other later described algorithms, may be implemented as a software or firmware module stored in a memory circuit within an array controller, such as the array controller 112 illustrated in FIG. 1. In another embodiment, the read algorithm may be implemented within application-specific circuitry, such as an ASIC on the host system 102 motherboard or on the array controller card 112, and/or through host software, such as a software driver, which may be part of the host operating system. The circuitry may be located in a package having a plurality of terminals coupled to the array controller circuitry or to the array drives. As later described, the array performance may be further enhanced using an adaptive seek algorithm to select the first disk drive to be used to service an I/O request.

An advantage of one embodiment of the present invention's novel architecture, is that disks do not have to be reformatted to gain the enhanced performance. Using this architecture, it is therefore possible, for example, to add one or more mirrored drives to an existing, single-drive PC without moving or remapping the data currently stored on the existing drive. Rather than utilizing slow, risky remapping techniques, in one embodiment, the data stored on the existing drive is copied over to one or more new drives. However, in another embodiment, remapping of disks may be performed.

Table 1 illustrates a table containing the output from one run of an exemplary simulation of a read operation for a given zone in a two drive mirrored system using a non-optimal stripe size. Column 4 indicates the relative time, Column 5 indicates the disk position, Column 6 indicates the number of disk rotations relative to the beginning of the simulation, Column 7 indicates which LBA is being transferred, Column 8 indicates the skew count, Column 9 indicates the next LBA to be read after a head switch, Column 10 indicates the disk position or sector number of the next LBA indicated in Column 9, Column 11 indicates if the head is reading data, Column 12 indicates the status of the read operation. For illustrative purposes, this simulation shows just 12 sectors (LBAs) per track with a skew of 3 sectors, rather than more typical numbers of sectors per track and skew sizes, which are generally much greater.

As indicated in Columns 1 and 2, there are 12 LBAs/track, the stripe size is 1.17 tracks, or 14 LBAs, the skew is 0.25 tracks or 3 LBAs, the array is a 2 drive system, and the beginning LBA is 0. The stripe size has purposely been set to a non-optimal value of 14 sectors for the zone, which has 12 sectors, to compare the degraded performance of conventional systems with that of one embodiment of the present invention. Each row shows the events happening at each sequential time period, with time steps equal to the time to transfer one sector.

TABLE 1

| Column 1 | Col. 2 | Col. 4 | Col. 5 | Col. 6 | Col. 7 | Col. 8 | Col. 9 | Col. 10 | Col. 11 | Col. 12 |
|---|---|---|---|---|---|---|---|---|---|---|
| LBAs/track | 12 | Time | Disk Position | Rot | Xfer LBA | Skew Count | Next LBA | Next LBA Position | Active | Status |
| Stripe size in tracks(d) | 1.17 | | | | | | | | | |
| Stripe size in LBAs | 14.00 | 0 | 0 | 0 | 0 | 0 | | | 1 | data |

TABLE 1-continued

| Column 1 | Col. 2 | Col. 4 | Col. 5 | Col. 6 | Col. 7 | Col. 8 | Col. 9 | Col. 10 | Col. 11 | Col. 12 |
|---|---|---|---|---|---|---|---|---|---|---|
| Skew in tracks(s) | 0.25 | 1 | 1 | 0 | 1 | 0 | | | 1 | data |
| Skew in LBAs | 3 | 2 | 2 | 0 | 2 | 0 | | | 1 | data |
| Drives(N) | 2 | 3 | 3 | 0 | 3 | 0 | | | 1 | data |
| Beginning LBA | 0 | 4 | 4 | 0 | 4 | 0 | | | 1 | data |
| | | 5 | 5 | 0 | 5 | 0 | | | 1 | data |
| Transfer percentage | 0.611 | 6 | 6 | 0 | 6 | 0 | | | 1 | data |
| Seq % | 0.800 | 7 | 7 | 0 | 7 | 0 | | | 1 | data |
| Per disk relative to seq | 0.764 | 8 | 8 | 0 | 8 | 0 | | | 1 | data |
| Times faster | 1.53 | 9 | 9 | 0 | 9 | 0 | | | 1 | data |
| | | 10 | 10 | 0 | 10 | 0 | | | 1 | data |
| | | 11 | 11 | 0 | 11 | 0 | | | 1 | data |
| | | 12 | 0 | 1 | | 3 | 12 | 3 | 0 | head sw |
| | | 13 | 1 | 1 | | 2 | 12 | 3 | 0 | head sw |
| | | 14 | 2 | 1 | | 1 | 12 | 3 | 0 | head sw |
| | | 15 | 3 | 1 | 12 | 0 | | | 1 | data |
| | | 16 | 4 | 1 | 13 | 0 | | | 1 | data |
| | | 17 | 5 | 1 | | 3 | 28 | 10 | 0 | head sw |
| | | 18 | 6 | 1 | | 2 | 28 | 10 | 1 | head sw |
| | | 19 | 7 | 1 | | 1 | 28 | 10 | 0 | head sw |
| | | 20 | 8 | 1 | | 1 | 28 | 10 | 0 | wait |
| | | 21 | 9 | 1 | | 1 | 28 | 10 | 0 | wait |
| | | 22 | 10 | 1 | 28 | 0 | | | 1 | data |
| | | 23 | 11 | 1 | 29 | 0 | | | 1 | data |
| | | 24 | 0 | 2 | 30 | 0 | | | 1 | data |
| | | 25 | 1 | 2 | 31 | 0 | | | 1 | data |
| | | 26 | 2 | 2 | 32 | 0 | | | 1 | data |
| | | 27 | 3 | 2 | 33 | 0 | | | 1 | data |
| | | 28 | 4 | 2 | 34 | 0 | | | 1 | data |
| | | 29 | 5 | 2 | 35 | 0 | | | 1 | data |
| | | 30 | 6 | 2 | | 3 | 36 | 9 | 0 | head sw |
| | | 31 | 7 | 2 | | 2 | 36 | 9 | 0 | head sw |
| | | 32 | 8 | 2 | | 1 | 36 | 9 | 0 | head sw |
| | | 33 | 9 | 2 | 36 | 0 | | | 1 | data |

First, 12 sectors (LBA0–11) are transferred during time steps 0–11. Then, during three time steps 12–14, a head switch or sequential seek is performed. The skew count is three at time step 12, two at time step 13, and one at time step 14. No data is being read from the disk during the head switch. Next, during time steps 15–16, the last two LBAs of the stripe, LBAs 12 and 13, are transferred. The next sector to be transferred is LBA 28, because the second or mirror drive will be reading LBAs 14–27. At time steps 17–19, there are three time steps of skew, during which a head switch is performed. But at that point, LBA 28 is disadvantageously not yet under the read head. An additional two time steps of wait time are needed for rotational latency, that is, two additional time steps are needed until LBA 28 rotates underneath the read head. For this example, the overall efficiency relative to sequential reading is only 76%, and the total read performance of the two drives would be only 1.5 times the performance of a single drive. In other words, each of the two disks provides only 0.764 times the performance of performing a sequential read from one drive.

Table 2, below shows the same simulation, but with a stripe size of 21 sectors instead of 14. Thus, in accordance with one embodiment of the present invention, the stripe size has been advantageously chosen so that it directly relates to the number of sectors per track for the zone. In this example, for the two disk system, a preferred or optimum stripe size, StripeSize(k), was chosen according to Formula 1, below:

$$\text{StripeSize}(k)=k^{*}\ \text{TrackSize}-(k-1)^{*}\text{skew} \qquad (1)$$

where:

k is a positive integer; and

TrackSize is the size of the track using a unit of measure, such as sectors where an optimal or peak stripe size occurs at each value of "k." In one embodiment, the skew may be the lower of the head skew and the cylinder skew. In another embodiment, the skew may be the head skew. In still another embodiment, the skew may be the cylinder skew.

Using the formula above, the second optimal stripe size for the present example, with k=2, the track size equal to 12 sectors, and the skew equal to 3 is:

$$\text{StripeSize}(2)=2^{*}12-(2-1)^{*}3=21$$

Note that there are now no extra wait cycles after the head switch to go from LBA 20 to 42. That is, the desired LBA is under the read head as soon as the head switch or seek is completed at time step 27, eliminating the inefficiencies introduced by rotational latency. The selected stripe size of 21 improves performance to 1.85 times the performance of a single drive, or 20% better than using the stripe size of 14 in the example illustrated by Table 1. In embodiment of Table 2, the performance is close to, but not exactly double, the single disk performance, because there is still an extra head switch at the end of every stripe. Going to larger stripes reduces this impact to the point where the read performance approaches the best that could be done with standard striping. Thus, by varying the stripe sizes for different disk zone, the overall performance can be greatly enhanced.

TABLE 2

| Column 1 | Col. 2 | Col. 4 | Col. 5 | Col. 6 | Col. 7 | Col. 8 | Col. 9 | Col. 10 | | |
|---|---|---|---|---|---|---|---|---|---|---|
| LBAs/track | 2 | Time | Disk Position | Rot | Xfer LBA | Skew Count | Next LBA | Next LBA Position | Active | Status |
| Stripe size in tracks(d) | 1.75 | | | | | | | | | |
| Stripe size in LBAs | 21.00 | 0 | 0 | 0 | 0 | 0 | | | 1 | data |
| Skew in tracks(s) | 0.25 | 1 | 1 | 0 | 1 | 0 | | | 1 | data |
| Skew in LBAs | 3 | 2 | 2 | 0 | 2 | 0 | | | 1 | data |
| Drives(N) | 2 | 3 | 3 | 0 | 3 | 0 | | | 1 | data |
| Beginning LBA | 0 | 4 | 4 | 0 | 4 | 0 | | | 1 | data |
| | | 5 | 5 | 0 | 5 | 0 | | | 1 | data |
| Transfer percentage | 0.739 | 6 | 6 | 0 | 6 | 0 | | | 1 | data |
| Seq % | 0.800 | 7 | 7 | 0 | 7 | 0 | | | 1 | data |
| Per disk relative to seq | 0.924 | 8 | 8 | 0 | 8 | 0 | | | 1 | data |
| Times faster | 1.85 | 9 | 9 | 0 | 9 | 0 | | | 1 | data |
| | | 10 | 10 | 0 | 10 | 0 | | | 1 | data |
| | | 11 | 11 | 0 | 11 | 0 | | | 1 | data |
| | | 12 | 0 | 1 | | 3 | 12 | 3 | 0 | head sw |
| | | 13 | 1 | 1 | | 2 | 12 | 3 | 0 | head sw |
| | | 14 | 2 | 1 | | 1 | 12 | 3 | 0 | head sw |
| | | 15 | 3 | 1 | 12 | 0 | | | 1 | data |
| | | 16 | 4 | 1 | 13 | 0 | | | 1 | data |
| | | 17 | 5 | 1 | 14 | 0 | | | 1 | data |
| | | 18 | 6 | 1 | 15 | 0 | | | 1 | data |
| | | 19 | 7 | 1 | 16 | 0 | | | 1 | data |
| | | 20 | 8 | 1 | 17 | 0 | | | 1 | data |
| | | 21 | 9 | 1 | 18 | 0 | | | 1 | data |
| | | 22 | 10 | 1 | 19 | 0 | | | 1 | data |
| | | 23 | 11 | 1 | 20 | 0 | | | 1 | data |
| | | 24 | 0 | 2 | | 3 | 42 | 3 | 0 | head sw |
| | | 25 | 1 | 2 | | 2 | 42 | 3 | 0 | head sw |
| | | 26 | 2 | 2 | | 1 | 42 | 3 | 0 | head sw |
| | | 27 | 3 | 2 | 42 | 0 | | | 1 | data |
| | | 28 | 4 | 2 | 43 | 0 | | | 1 | data |
| | | 29 | 5 | 2 | 44 | 0 | | | 1 | data |
| | | 30 | 6 | 2 | 45 | 0 | | | 1 | data |
| | | 31 | 7 | 2 | 46 | 0 | | | 1 | data |
| | | 32 | 8 | 2 | 47 | 0 | | | 1 | data |
| | | 33 | 9 | 2 | | 3 | 48 | 0 | 0 | head sw |

Figure 3A:
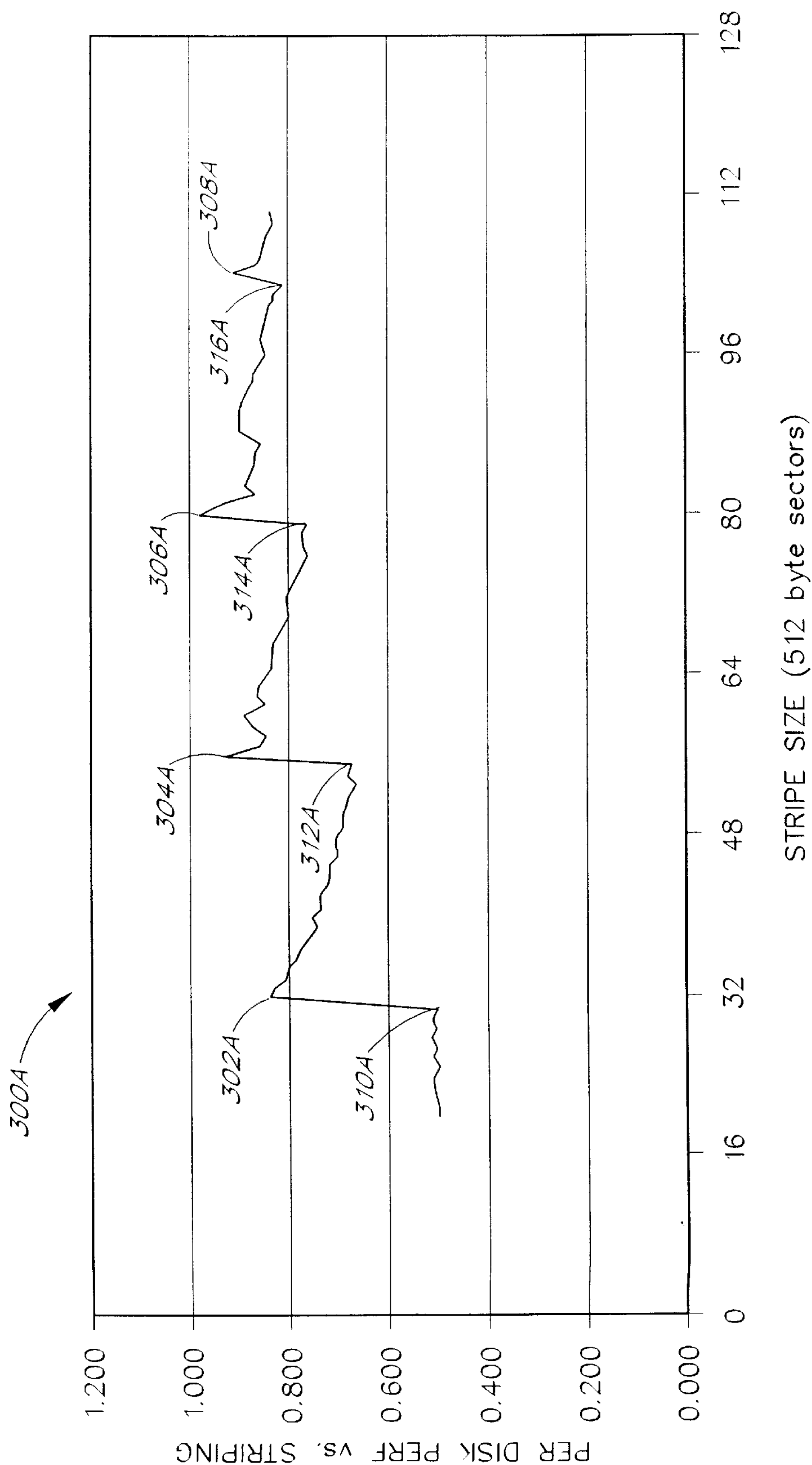
FIG. 3A is a graph illustrating the results of a first exemplary system simulation.

FIG. 3A shows the results of running the simulation with stripe sizes from 20 to 110 sectors (10–55 KB) for a two disk mirrored array, with 32 sectors per track, and a skew of 8. The vertical axis of the graph 300A indicates the per disk performance versus striping. The horizontal axis indicates the stripe size in sectors, where a sector is 512 bytes. The peaks 302A, 304A, 306A, 308A in the graph 300A show the points where there is substantially no waiting between stripes, and the valleys 310A, 312A, 314A, 316A indicate the points where there is nearly a full revolution of waiting between stripes. Using Formula 1, peaks exist at stripe sizes of about 32 sectors, 56 sectors, 80 sectors, and 104 sectors, corresponding graph peaks 302A, 304A, 306A, 308A. In practice, the "optimal" stripe sizes may be selected as those falling a few sectors to the right of each peak to account for the possibility of defective sectors. In addition, it may be noted that in the present embodiment, for large values of "k," such as values of greater than 3 for a two drive array, using the calculated stripe sizes provides diminishing or decreasing sequential transfer performance. Thus, for a two drive array, one of the first 3 peaks may be preferably used to select the stripe size. These selected stripe sizes may also be referred to as SkipSizes.

Figure 3B:
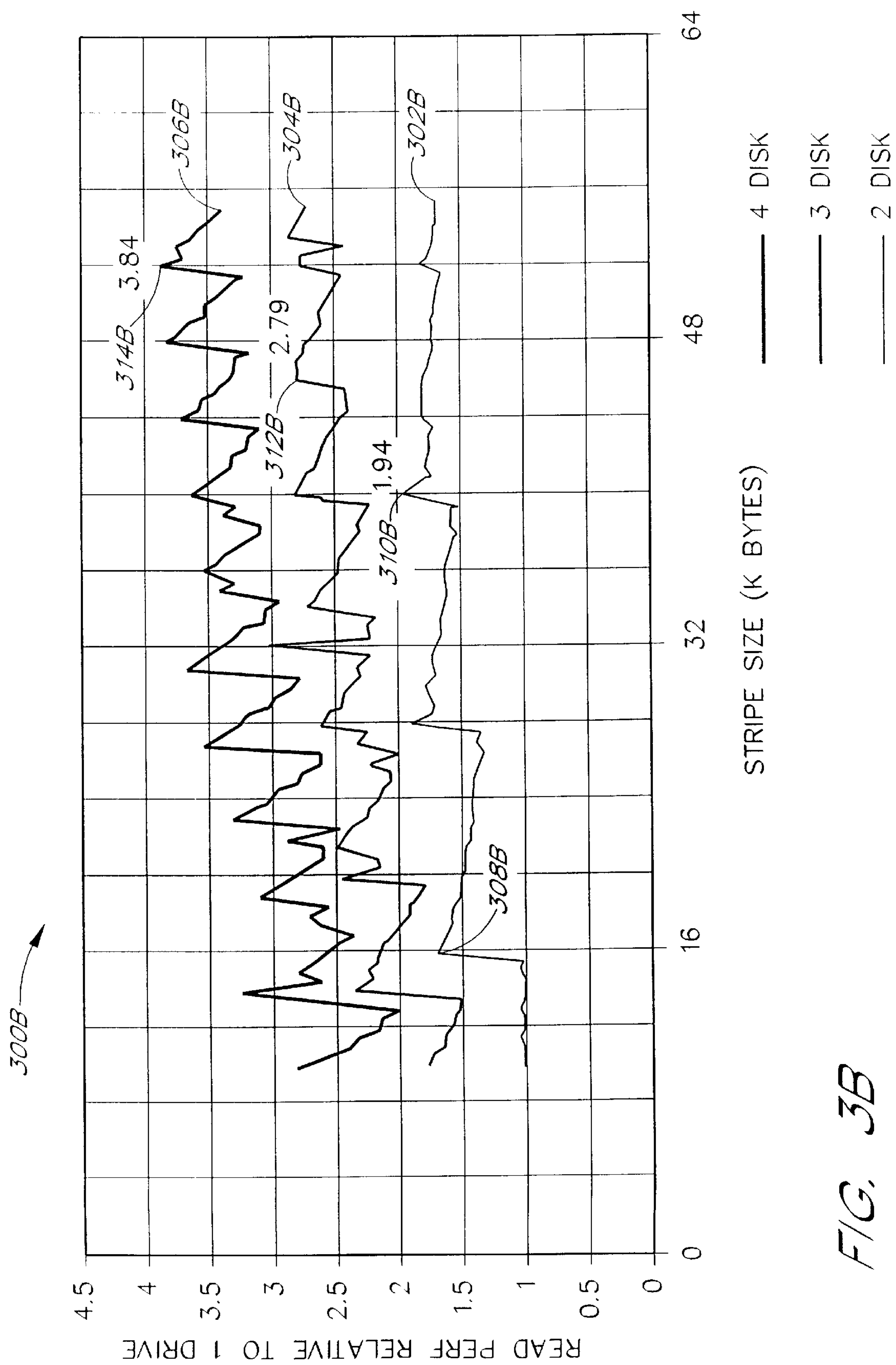
FIG. 3B is a graph illustrating the results of a second, third and fourth exemplary system simulation.

FIG. 3B shows the simulation results for a 512 Kbyte sequential read, where the zone being profiled has 32 sectors/track, and a sector skew of 8. The simulation profiles 2, 3, and 4 drive mirrored arrays on lines 302B, 304B, 306B, where the same data is being read from each drive. Thus, the present invention may advantageously be used with more than 2 mirrored drives. The simulation results for larger stripe sizes may not be as accurate as the simulation results for smaller stripe sizes due to the limited length of the simulation.

The vertical axis of the graph 300B indicates the read performance relative to one drive, and the horizontal axis indicates the stripe size in Kbytes. At the first peak 308B of the two drive graphed line 302B, the data rate is not quite equal to reading the drive sequentially, because one extra disk skew is required when skipping the track read by the other drive. Later peaks have a higher transfer bandwidth because the extra skew is distributed across more tracks of transferred data. The system 100, including the array controller 112, illustrated in FIG. 1, may utilize this phenomenon by setting a stripe size at one of the graph peaks, and by accessing alternating stripes from the two drives at substantially the same time. Using this novel technique, long or large sequential reads are performed at nearly twice the transfer rate of a single drive, as indicated by peak 310B. The transfer peaks shift to the left at zone crossings when moving from the outer diameter of the disk toward the inner tracks.

As indicated by the graph 300B, overall array read performance improves with each added drive. For example, referring to line 304B for a 3 drive array, at peak 312B the system array read performance is 2.79 times that of a single disk. Similarly, referring to line 306B for a 4 drive array, at peak 314B the system array read performance is 3.84 times that of a single disk.

The peaks occur at closer intervals with each drive added. Thus, for a three disk array, the graph peaks, and hence the number of optimal stripe sizes, may occur with approximately twice the frequency of a two disk system. Similarly, for a four disk array the peaks may occur with approximately three times the frequency of a two disk system.

The desired read stripe sizes for actual disks and disk zones may be determined using the disk profiling algorithm below:

```
Get StartingLBA and Drives from command line
MeasureStripe
    For StripeSize=1 LBA to 1000 LBAs
        Start timer
        StripedRead(StripeSize)
        Stop timer
        Print stripe size and timer
StripedRead(StripeSize)
    i=StartingLBA
    While i<StartingLBA+10 MB
        Read from i to i+stripesize−1
        i=i+stripesize*(Drives−1)
```

Within the algorithm, either a striped read or striped write may be used to profile the disk.

A user or another program provides the starting LBA. The algorithm than performs repeated read operations using different stripe sizes, such as stripe sizes varying from 1 to 1000 LBAs. As a practical matter, certain stripe sizes, such as a stripe size of 1 LBA, will typically not provide adequate performance, and so may not be tried at all to reduce profiling time. The read operations are timed for each stripe size. The stripe size and time may then be printed in graph format, such as those in FIGS. 3A, 3B, and 4, or in a table format or the like.

Figure 4:
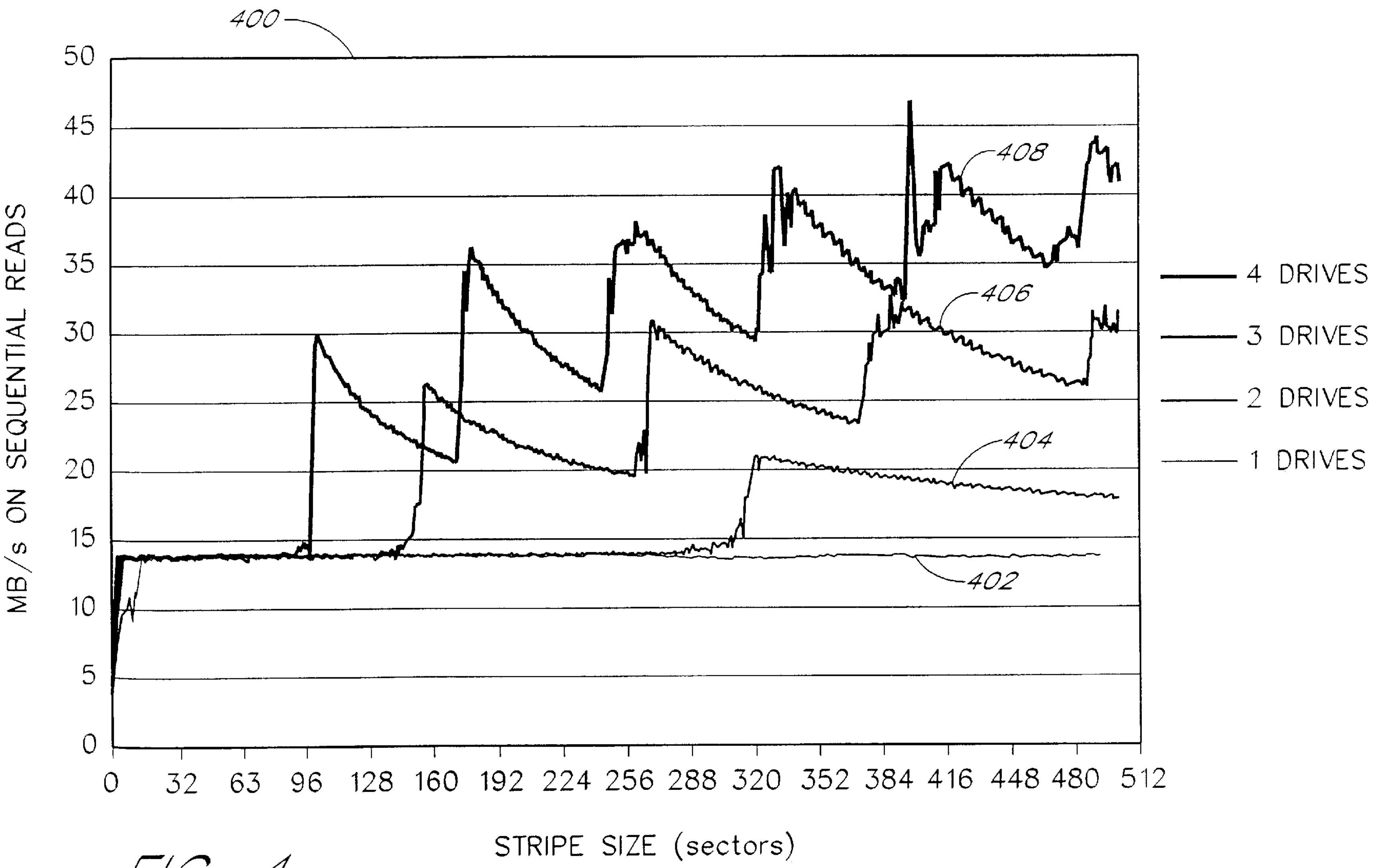
FIG. 4 is a graph illustrating the test results for different array embodiments.

FIG. 4, for example, illustrates the results produced by a software program using an algorithm similar to that described above during actual profiling of a Maxtor 7.5 GB drive. The performance of a one drive 402, a two drive 404, a three drive 406, and a four drive 408 are charted by the graph 400. The data generated by the profiling may be used to produce a set of better or optimal stripe sizes for each zone. For example, for a given array size, one may want to select a stripe size substantially corresponding to one of the peaks illustrated in the graph. Larger stripes give slightly more bandwidth, but the application must make larger accesses to benefit from the larger stripes. In practice, the manufacturer could pick a stripe size for a given zone that is good for most applications, or could allow the user to directly pick the stripe size. As described below, in another embodiment, the stripe size to be used within a given zone can be selected dynamically based on the size of the I/O operation, such that different stripe sizes may be used to access the same zone for different I/O operations.

One embodiment of a read algorithm, which may be used to select the appropriate stripe size of a given read operation, will now be described. As previously discussed, after the disk is profiled, the information may be kept in a table accessible by the read algorithm, which may be implemented in the array firmware or host software. This table, illustrated in FIG. 5A, contains the beginning LBA and stripe size for each zone. For example, Zone 1 begins at LBA 0, and has a preferred or optimal stripe size of $\alpha$ entered into the Stripe Size column, where the value of $\alpha$ may have been determined using the profiling technique described above. Similarly, Zone 1 begins at LBA2, and has a preferred or optimal stripe size of $\beta$ entered into the Stripe Size column. The firmware does a binary search of this table to look up the stripe size for a given LBA. In embodiments in which the stripe sizes are selected dynamically based on I/O size, multiple different possible stripe sizes may be stored for each zone, each corresponding generally to one peak in the corresponding graph, as illustrated in FIG. 5B. For example Zone 0 has different stripe sizes $\alpha$, $\alpha'$, $\alpha''$ which may be used with corresponding different I/O request sizes x, y, z.

In one embodiment, the variable stripe size technique described above can be applied both to arrays that use identical drives and to arrays that have drives that differ in capacity, performance, and/or formatting. The ability to use different types of drives in an array is particularly advantageous for upgrading existing systems. A customer may choose to increase system and array performance, reliability and capacity, by adding a second disk to an existing one-disk system, with at least a first portion of the new disk mirroring the existing disk. When the disks have a different capacity, the size of the mirrored portion may be set equal to the capacity of the smaller of the two drives. The remaining disk space of the larger drive may be made available as a separate non-redundant partition, thereby making efficient use of the larger disk.

Different stripe sizes may be used with different drives of the same array, as may be desirable where the array includes multiple disk drive types. To allow the use of different types of drives, the zone tables illustrated in FIGS. 5A and 5B may be accordingly modified. In addition, the technique used to determine stripe sizes may be modified as well. Two disks that are not identical are generally formatted with zone breaks at different LBAs. To account for this difference, the zone table may be constructed to increment the zone count at every LBA where either drive switches zones. For instance, if both drives have 16 zones, the constructed zone table may have up to 32 zones. Within each zone of the zone table, both drives have a constant, though possibly different, number of sectors per track. For the following discussion, "zone" refers to the zone table.

The stripe sizes of the two drives may be separately optimized to minimize the wasted time when a drive skips over the stripe handled by the other drive. For instance in Zone 1, assume the two drives, Drives A and B, each have stripe sizes a1 and b1, and both drives have data logically arranged in alternating groups of sectors [a1 b1 a1 b1 . . . ]. Normally the "a" sectors will be read from Disk A, and the "b" sectors will be read from Disk B.

Both drives are profiled to determine the peaks where sequential read performance is maximized or at a desired rate. One of the transfer peaks of Drive B is picked to be the stripe size a1, and one of the transfer peaks of Drive A is picked to be the stripe size b1. The reason for using the other drive's profile information is that the stripe size of one drive determines how much data is to be skipped over on the other drive. Generally, the stripe size for the larger drive is picked first, then the stripe size for the smaller drive is picked to be near a peak, but also to make the transfer time of the two drives approximately equal. This generally means that a peak corresponding to a higher LBA is picked for the smaller drive to allow the larger and faster drive to spend about the same time transferring the large stripe as the smaller, slower drive spends transferring the smaller stripe.

In another embodiment, the stripe size may be selected by first picking a stripe for the larger drive, as if the two drives were identical. The pair of disks may then be profiled while incrementing the stripe size for the second drive until a maximum or desired read transfer rate is found.

By way of example, assume the array includes a first drive, such a Western Digital 4.3 GB, 5400 RPM drive, and a second, relatively larger drive, such as a Maxtor 7.5 GB 7200 RPM drive. When the first zone, on the outer diameter, of the second drive is profiled, transfer peaks may be found at 325 sectors (10.5 MB/s) and 538 sectors (10.3 MB/s). The first peak at 325 sectors may be selected as the stripe size to be used for the first drive. When the first drive is profiled, the first peak may be found to be at 291 sectors (8.3 MB/s) and the second peak at 544 sectors (7.6 MB/s). The second peak is picked to at least somewhat equalize the transfer rates. The final result is a combined stripe size, summing the stripe size of both drives, of 325+544=869 sectors. The first drive transfers 325 sectors, skips 544 and transfers the next 325 sectors. The second drive transfers 544, skips 325 and transfers the next 544. The first drive takes about 20.3 ms to transfer 325 sectors at 8 MB/s, and the second drive takes about 26.4 ms to transfer 544 sectors at 10.3 MB/s. The longer of the two times dominates, so it takes 26.4 ms to transfer the entire combined or summed stripe of 869 sectors for an aggregate rate of 16.5 MB/s.

This technique advantageously allows a customer to add a second disk at a low cost, while achieving nearly twice the read performance, and further provides the customer the ability to protect the original disk's data with mirroring, and the addition of substantial storage capacity. Thus, this technique provides an excellent method of upgrading existing systems with the latest drive technology.

Figure 6:
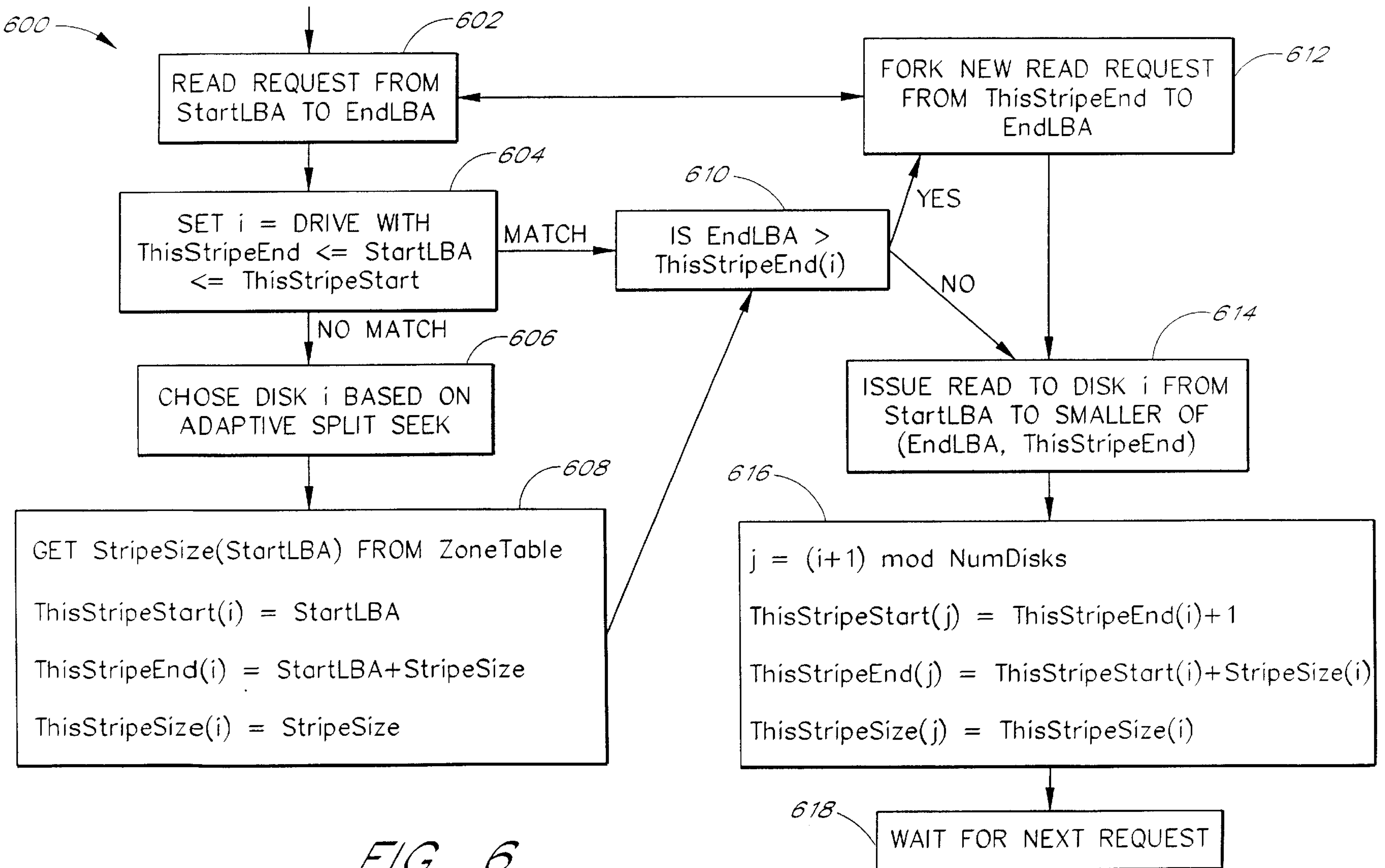
FIG. 6 is a flow diagram illustrating one embodiment of a read algorithm.

FIG. 6 shows one embodiment of the read algorithm 600. The firmware keeps state information (ThisStripeStart, ThisStripeEnd) that is used to determine if a striped read is already in progress or not. This information is used like a single-entry cache to determine if the next request is to a stripe that has recently been accessed, or to the next sequential stripe. In effect, the cache determines if a striped read was already in progress, or if a new disk must be chosen to begin the access. The disk choice can be performed using the novel Adaptive Split Seek algorithm described below, or could be performed using a different metric, such as picking the one with smallest queue depth, or alternating accesses. If a striped read is already in progress, then the reads are issued on the current disk until the end of the current stripe, and the next disk starting with the next stripe, until the end of the transfer has been satisfied.

One benefit of the exemplary algorithm is that no division is required to determine where the accesses start or end. Furthermore, in one embodiment, when beginning a new access, there are no wasted accesses of less than the full stripe size. However, in other embodiments, accesses of less than the full stripe size may also be performed. The algorithm 600 also naturally makes striped accesses for requests larger than one stripe and separate independent accesses for requests less than a stripe. Thus, multiple disk arms (not shown) need not be moved unnecessarily. The algorithm 600 also effectively stripes accesses that are issued as many small sequential reads instead of one large sequential read.

A read request from StartLBA to EndLBA is received at state 602. Proceeding to state 604, a determination is made if a stripe read is in progress. The variable "i" is set to the drive with a stripe end, ThisStripeEnd, less than or equal to the StartLBA, and which has a stripe start, ThisStripeStart, greater than or equal to the StartLBA, that is, to the drive with a start LBA within the requested stripe. If a match exists, and therefore there is a read in process, the algorithm 600 proceeds to state 610.

At state 610, a determination is made if the end LBA variable, EndLBA, is greater than the stripe end variable, ThisStripeEnd, for the drive "i," that is, if the requested end LBA is within the current stripe being read. If the end LBA is greater than the value of ThisStripeEnd, the algorithm proceeds to state 612, where a new read request is forked from the address ThisStripeEnd to the address EndLBA so that the read request to EndLBA may be completed. The algorithm 600 then proceeds to state 614. If, instead, the value of EndLBA is not greater than the value ThisStripeEnd, the algorithm proceeds to from state 610 directly to state 614. At state 614, a read request is issued to disk "i" from StartLBA to the smaller of the end LBA, EndLBA, and the stripe end, ThisStripeEnd. Thus, reads are issued on the current drive "i" until the end of the current stripe or until EndLBA is reached Proceeding to state 616, variables for reads of the next stripe to the next disk "j" are initialized. The variable "j" is set equal to i+1 using as a modulus the number of disks NumDisks. That is, if there are two disks, Disks 0 and 1, if i=0, then j=1. If, instead, i=1, then j=0. ThisStripeStart(j) is set equal to ThisStripeEnd(i)+1, that is, the stripe start for disk "j" will follow the previous stripe end for disk "i." The stripe end ThisStripeEnd(j) for disk "j" is set equal to ThisStripeStart(i) plus the stripe size StripeSize(i). In one embodiment, the stripe size for disk "j," ThisStripeSize(j), is set equal to ThisStripeSize(i). Proceeding to state 618, the algorithm waits for the next read request.

If, back at state 604, no match was found, the algorithm 600 proceeds to state 606. The disk "i" is then chosen using the adaptive split seek algorithm described below. Proceeding to state 608, the stripe size, StripeSize, for the given start LBA is retrieved from the Zone table, such as the tables illustrated in FIGS. 5A and 5B. The variable ThisStripeStart (i) is set equal to the StartLBA, ThisStripeEnd(i) is set equal to the value of StartLBA plus the stripe size, and the variable ThisStripeSize(I) is set equal to the stripe size. The algorithm then proceeds to state 610, and further proceeds as described above.

Figure 7:
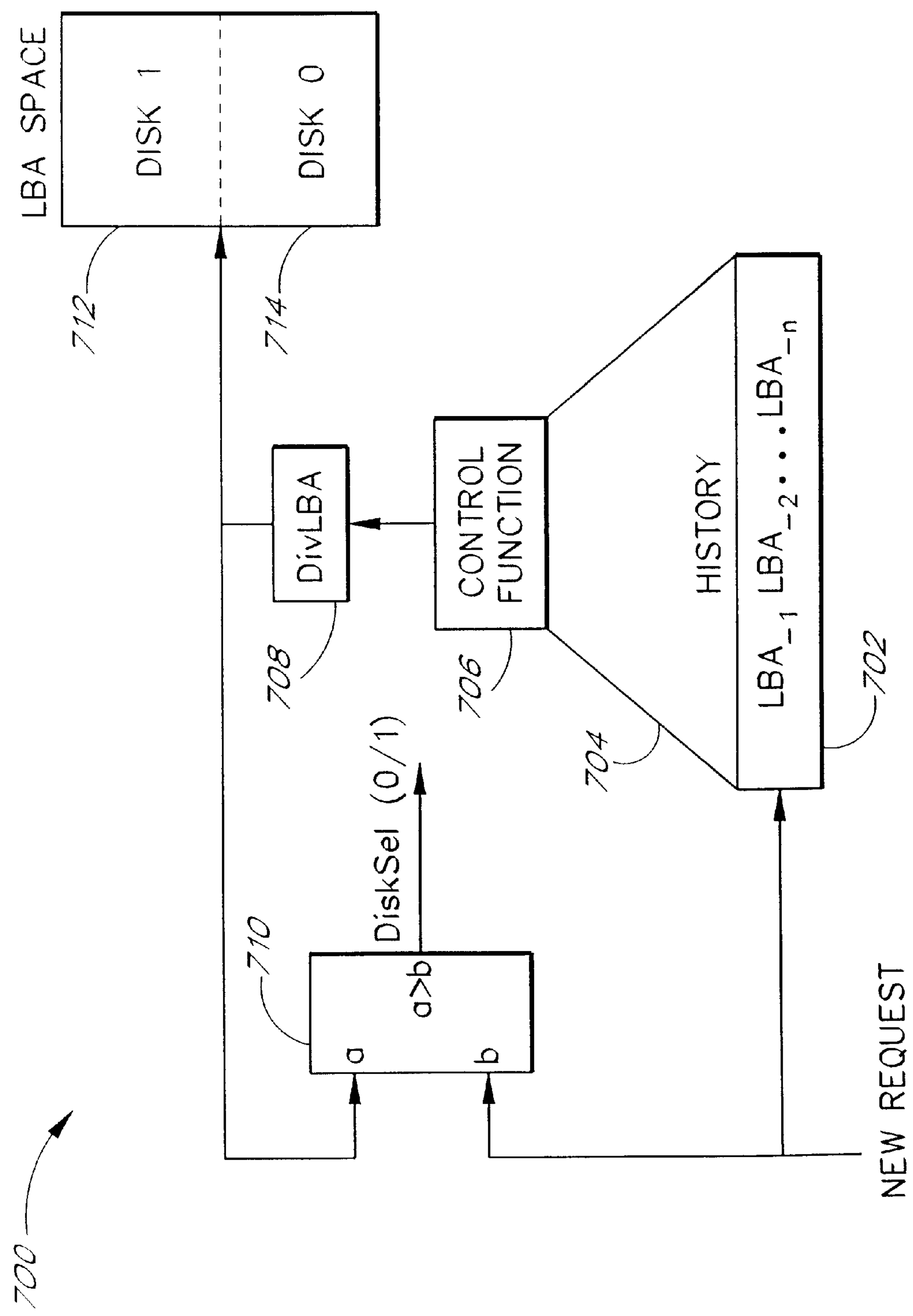
FIG. 7 illustrates one embodiment of a system configured to perform adaptive seeks in a two disk array.

The novel adaptive split seeks technique, which may be used for load balancing, will now be described. An adaptive split seeks algorithm may be implemented using hardware, a firmware module, or a combination of hardware and software. Short I/O performance in particular can be increased by an adaptive algorithm, which dynamically selects the disk to service new I/O requests. FIG. 7 illustrates one embodiment of an adaptive split seeks algorithm 700 which may be used with a two disk drive array 712. A boundary register 708 holds the LBA number to denote the dividing line 714 between the Drives 0 and 1. In one embodiment, LBAs below the register value are serviced by Drive 0, and those above are serviced by Drive 1. In another embodiment, the algorithm may be used for only short I/Os of or below a predetermined size.

The firmware keeps track of the history 704 of the last N requests. In one embodiment, the firmware keeps track of requests equal to or below a certain size, for example, where, N may be on the order of a few dozen requests. For each request, the firmware records the LBA and the drive that handled that request.

The firmware also has a control function 706 that adjusts the boundary register 708 based on the recorded history 704. Many control function types may be used with the present invention. For example, the algorithm may be used to keep track of the average LBA in the recorded history 704. After each new access, the register 708 may be adjusted or incremented by the new LBA number, and may be adjusted or decrementd by the oldest LBA number. The resulting adjusted average LBA value may then be used as the dividing line, to thereby dynamically balance the load. The register value is thus dynamically adjusted to advantageously track the point where approximately half the random requests are handled by each drive.

During an intense period of accessing part of the data set, the head arms will divide, and one drive will handle the outermost requests, and the other drive will handle the innermost requests. Thus, if a new read request is received, a comparator 710 compares the requested LBA with the average LBA from the register 708. If the requested LBA is greater than the average LBA, then Disk 1 is selected. Otherwise, Disk 0 is selected. In one embodiment, this technique works even if all requests are within a single zone. The algorithm 700 also works in the case where a large number, such as 90%, of the requests are to one region, and a small number, such as 10%, of the requests are to another region a long way from the other region. The arm of one disk will then stay with the remote data and the arm of the other disk will stay with the local data. By including the LBA number in the average, the algorithm 700 takes into account the extra penalty for long seeks.

The size of the history 704, and thus the speed of the adaptation, may be selected to be large enough to ensure that oscillation does not occur, and small enough to ensure the adaptation occurs quickly enough to adequately balance the disk loading.

Figure 8:
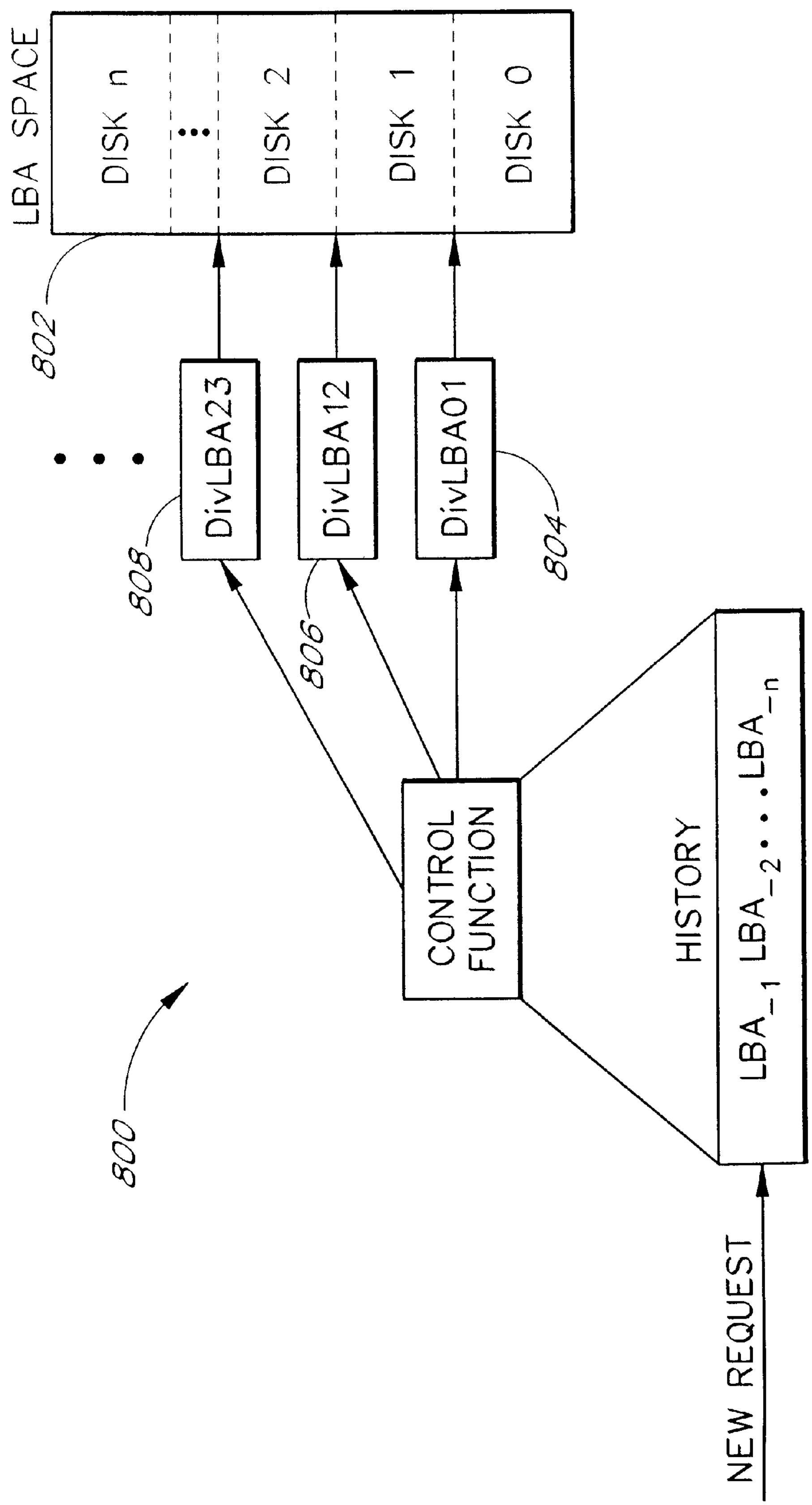
FIG. 8 illustrates one embodiment of a system configured to perform adaptive seeks in a disk array having multiple drives.

As illustrated in FIG. 8, in one embodiment, when the algorithm 800, similar to the algorithm 700, is extended an array 802 having more than two drives, additional registers 804, 806, 808 are added to divide the LBA space into as many regions as there are disks 0–n. In other aspects, the algorithm 800 is similar to the algorithm 700.

In another embodiment, the median LBA, rather than the average LBA, of the last N accesses may be used as the dividing line. This approach can be extended to multiple drives by partitioning the last N accesses into equal sized buckets equal to the number of drives.

Figure 9:
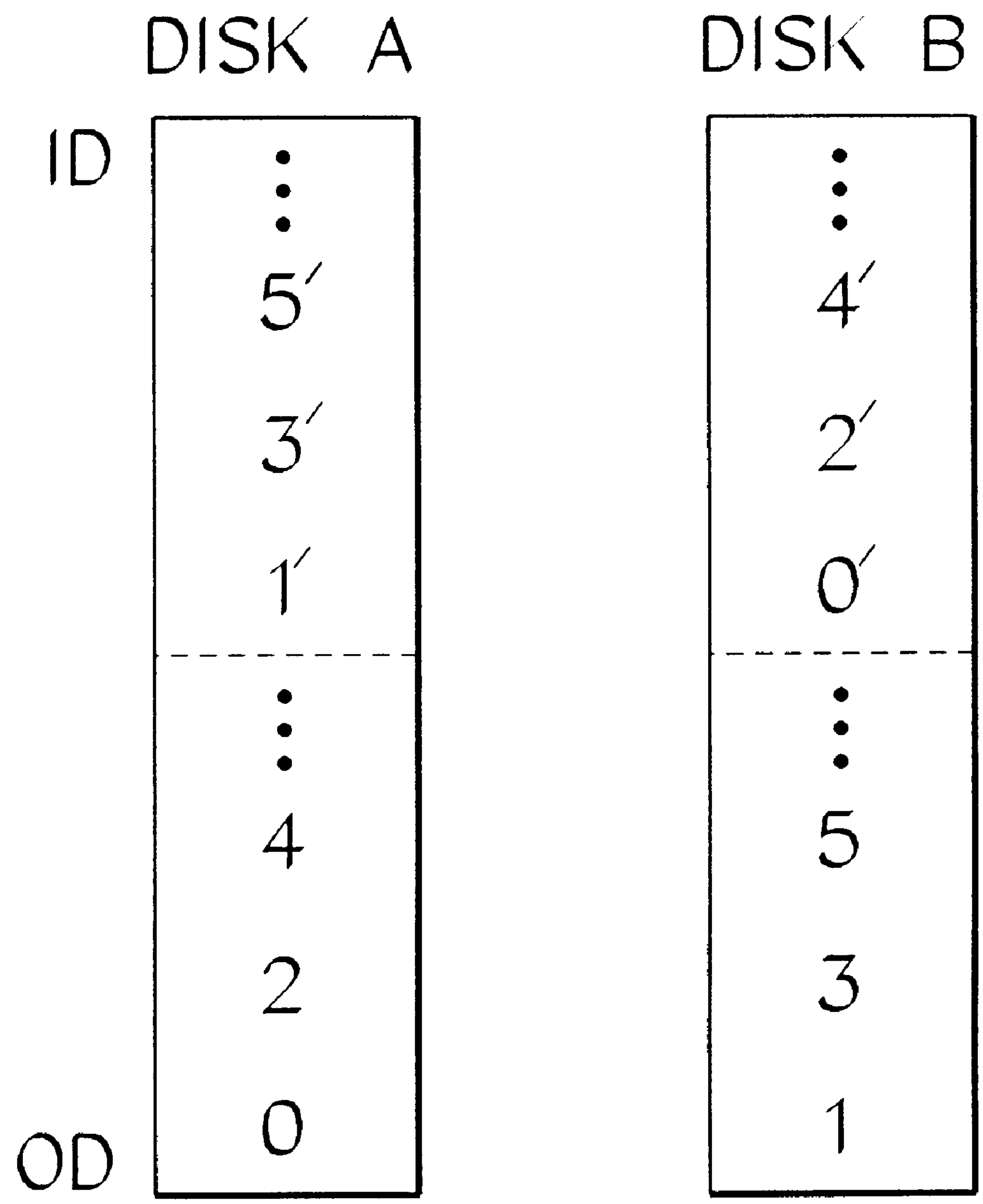
FIG. 9 illustrates one embodiment of a system that stores data in a different arrangement on at least two disks.

Although the above-described architecture does not require the use of a special write or mirroring scheme, one may nevertheless be used to further increase performance. As illustrated in FIG. 9, in one embodiment, mirrored data may be arranged and ordered to enhance I/O operations using a system that combines striping and mirroring. Thus, the data is arranged to achieve the performance advantages of striping and split seeks, while still having the reliability offered by mirrored disks. Each number in Disk A and Disk B represents a block of data equivalent to a striping unit or size. For example, the stripe size may be 8 Kbytes, 16 Kbytes, etc. In contrast with conventional mirroring, where two drives store data in an identical order or structure, in one embodiment of the present invention, a first a set of data may be stored on a first disk in a first arrangement, and the same set of data is stored on a second disk in a second arrangement or order.

For example, at least a portion of the data set stored on the second disk may be arranged or structured in a reverse arrangement as compared to the arrangement the data set portion is stored on the first disk. Thus, as illustrated in FIG. 9, in one embodiment, even blocks 0, 2, 4, etc., of the data set may be stored on the outer portion of Disk A, and odd blocks 1', 3', 5', etc., of the data set may be stored on the inner portion of the Disk A. By contrast, odd blocks 1, 3, 5, etc., of the data set may be stored on the inner portion of Disk B, and even blocks 0', 2', 4', etc., of the data set may be stored on the inner portion of Disk B. The data blocks whose numbers are marked with the prime or ['] mark, are considered the mirrored data, to be accessed with the non-primed version of the data is unavailable. The striping operation may be accomplished by striping data starting at the outer diameter, and then reverse striping with the mirrored data at a selected point, such as approximately midway through the disk. All or part of each of Disk A and Disk B may be used to hold the data set. In one embodiment, other portions of Disk A and B may be used to store data using the same arrangement for both disks, or unrelated data arrangements for each disk.

When both Disks A and B are working, even and odd blocks of the data set may be read from the corresponding outer disk portions, which have higher transfer rates than the inner disk portions, of the first and the second disks. Thus, when reading the data set, it is not necessary to perform seeks to the inner portions of the first and the second disks, thereby speeding access times. If one disk fails, then all data will be read from the working drive.

For write operations, both inner and outer disk portions are written, but, in one embodiment, only 1 seek may be needed between writing the primary and mirror blocks. For example, all the even blocks may be queued up and written sequentially to the outer portion of Disk A, and then, after performing a seek, queued up odd blocks of data may be written to the inner portion of Disk A.

Figure 10:
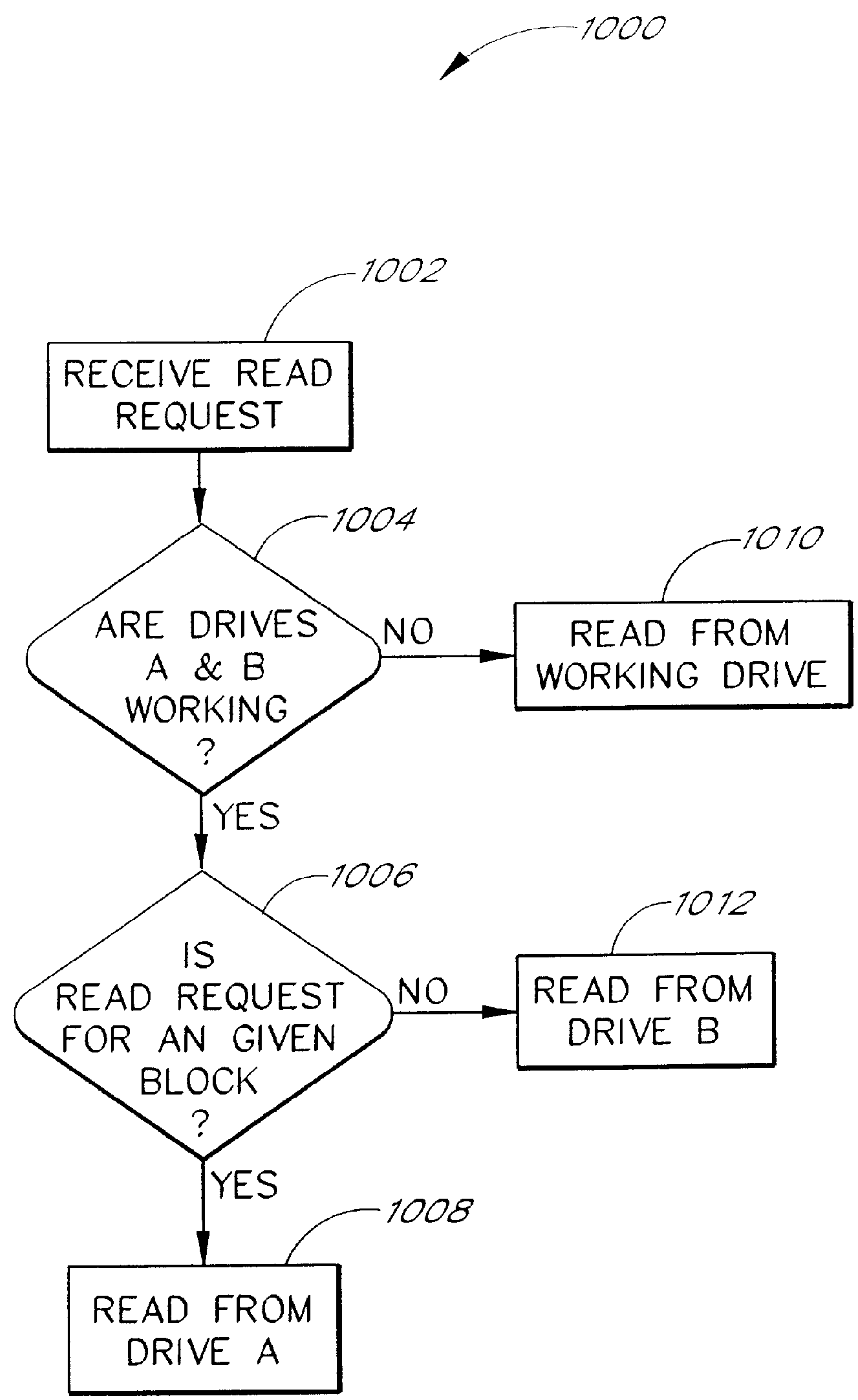
FIG. 10 is a flow diagram illustrating one embodiment of a read algorithm, which may be used, with the embodiment illustrated in FIG. 9.

FIG. 10 illustrates one read algorithm 1000, which may be used with the data arrangement system described above. A read request is received at block 1002. Proceeding to block 1004, a determination is made if both Drives A and B are functioning properly. If one disk has failed, the algorithm proceeds to block 1010. The requested data is then read from the remaining operation drive. If, instead, both Drives A and B are operational, the algorithm proceeds from block 1004 to block 1006. A determination is made whether the read request is for an even block. If the request is for an even block, the data is read from Drive A, which has the even data blocks stored on the outer portion of the disk. If, instead, the request is for an odd block, proceeding to block 1012, the data is read from Drive B, which has the odd data blocks stored on the outer portion of the disk. Thus, both even and odd data blocks may be read from the portions of the disks having higher transfer rates.

While the exemplary embodiments described above use RAID 1 mirrored systems, the present invention may be utilized with other array configurations, such as, by way of example, RAID 5 systems. RAID 5 systems, typically having 3 or more drives, provide a way to recover from a drive failure without having duplicate copies of data on each drive. Instead of using duplicate sets of data, RAID 5 systems use parity to provide for data recovery. RAID 5 works by striping data across the disks, and adds parity information that can be used to reconstruct data lost as a result of an array drive failure. RAID 5 systems offer both advantages and disadvantages as compared to RAID 1 systems. RAID 5 has less overhead than RAID 1. For example, in a RAID 1 system, typically 50% of the available storage capacity is dedicated to storing redundant data. By contrast, a four drive RAID 5 system devotes only 25% of the available storage capacity to storing parity information. However, RAID 5 systems typically need at least 3 drives, as opposed to only 2 drives in RAID 1 systems.

Conventionally, in RAID 5 systems, data is arranged with N−1 data stripes and a parity stripe distributed across N drives. The parity rotates across the drives to distribute the load evenly across all drives.

With the traditional data layout, sequential reads can be improved somewhat by simultaneously reading from all of the drives. However, while sequential performance of a conventional N-drive RAID 5 array can be greater than a single drive, the transfer rate is significantly below N times the transfer rate of a single drive. For instance, to read 36 blocks of data from 4 drives, Disk 0 reads data blocks 0, 4, 8, . . . 32, Disk 1 reads blocks 1, 5, 9, . . . 33, Disk 2 reads 2, 6, 10, . . . 34, and Disk 3 reads 3, 7, 11, . . . 35. Although all 4 drives participate in the large read, each disk does not read at peak efficiency because there are parity stripes that must be skipped over. With small fixed-length stripes, the parity stripes are less than one disk track, and the drive merely waits while the unneeded data passes under the read head. The total data rate is equivalent to the data rate that would have been obtained by a disk array with one less drive, but with all transferring at full efficiency. Thus, the transfer rate is significantly below N times the transfer rate of a single drive. In conventional RAID 5 systems, the maximum bandwidth is N−1 times the bandwidth of one drive, even though N drives may be involved in the transfer. Thus, in conventional systems, the percentage of time each drives transfers is actually only (N−1)/N.

As described in greater detail below, in contrast to conventional systems, one embodiment of the present invention uses variable stripe sizes to increase the sequential read performance to nearly N times the performance of one drive. Given that RAID 5 arrays are often small (with N ranging from 3 to 8), the performance increase can be substantial.

Figure 11:
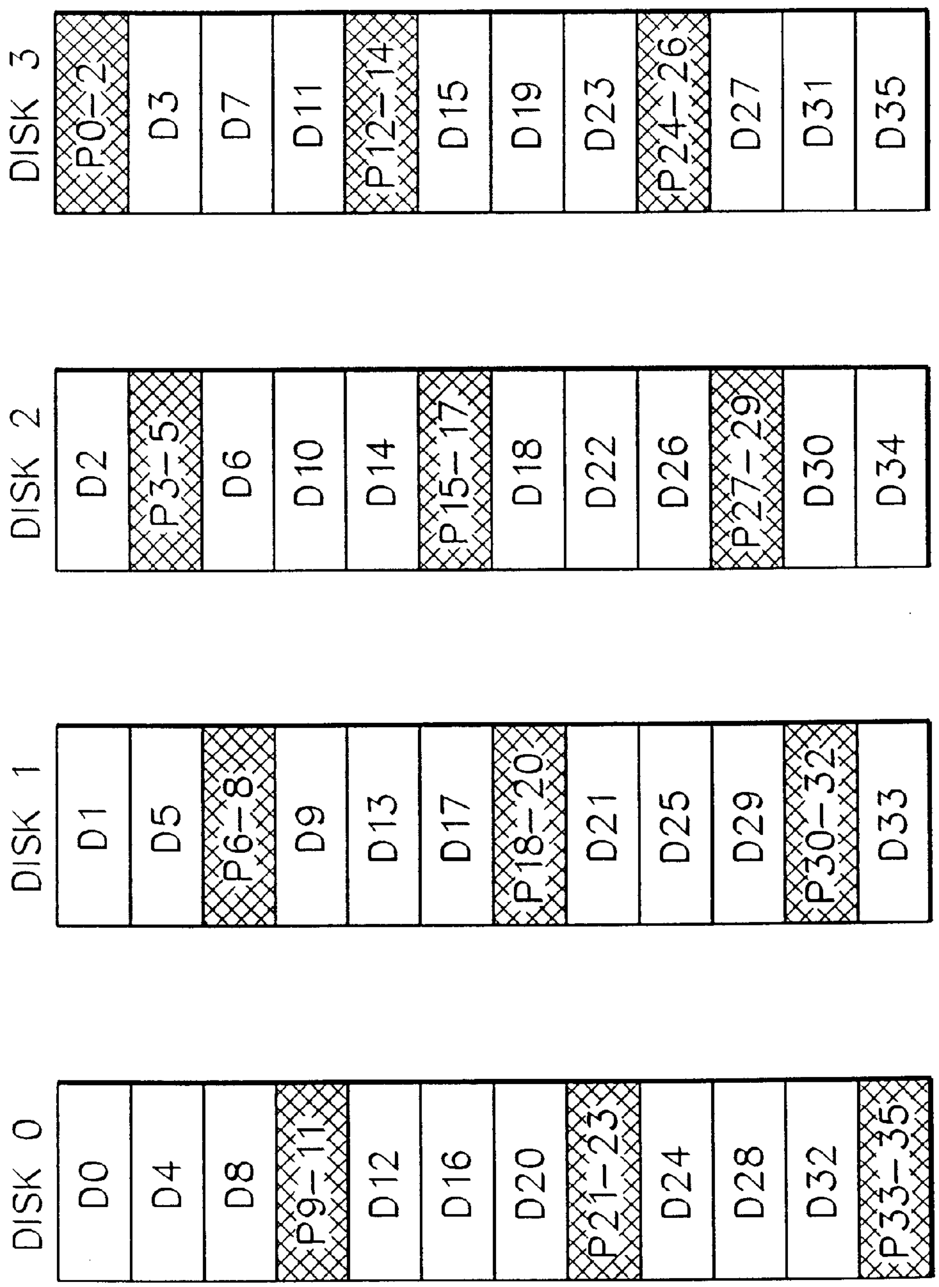
FIG. 11 illustrates a first data layout for one embodiment of the present invention used with a RAID 5 array.

FIG. 11 shows an exemplary data layout which may be used with one embodiment of the present invention. As in conventional RAID 5 systems, data and parity are rotated across the disks, Disk 0–5. However, in contrast to conventional systems, which use stripe size smaller than 1 track in size, stripe sizes in the present invention may be selected to be substantially equal to a SkipSize. Thus, the stripe size may be equal to or larger than 1 track. Furthermore, in one embodiment, as with the RAID 1 example discussed above, different stripe sizes are used for different zones. By thus appropriately selecting the stripes sizes, sequential read performance is increased because the time to skip over the parity blocks is reduced or minimized. In one embodiment, the sequential read access transfer rate for an array of N drives exceeds (N−1) times the sequential read access transfer rate of a single drive. When the array has drives with different read performances, the overall array performance exceeds (N−1) times the sequential read access transfer rate of the slowest drive. Ideally, the read performance of a N array of disks using one embodiment of the present invention will approach or equal N times the performance of a single drive.

Using the technique described above, the data arrangement of FIG. 11 can result in large stripe sizes. By way of example, the first SkipSize in an outer zone of a typical current generation 6–20 GB drive may be approximately 400 sectors (200 KB), equal to about 1 track. Large stripe sizes help the read performance for random reads of short records because each disk can be independently seeking to a different record. Hence, the data layout illustrated in FIG. 11 and described above increases the number I/Os per second, yet still provides good sequential read performance when reading files whose size is greater than the number of drives times the stripe size.

However, large stripes may not provide as good performance for workloads that require a large number of short writes. In RAID 5, for long writes, when a significant portion of a parity stripe is updated, the parity block update associated with the data block modification is first preceded by reading the data blocks not being updated, which are then XORed with the parity for the modified block, and the new parity is then written. Thus, for long writes, the old parity information is conventionally not read.

By contrast, for short writes, where, for example, one block of data is to be written, the old parity is read, as is the old data. The old parity, the old data, and the new data are then XORed to create the new parity block, which is then written to the disk. This makes short writes wasteful, because short writes involve two revolutions of the drive, one revolution for reading the old data and the old parity, and one revolution for writing the new data and the new parity. Hence, when workloads have a large number of short writes, the high write penalty may make the large stripe size less desirable.

Figure 12:
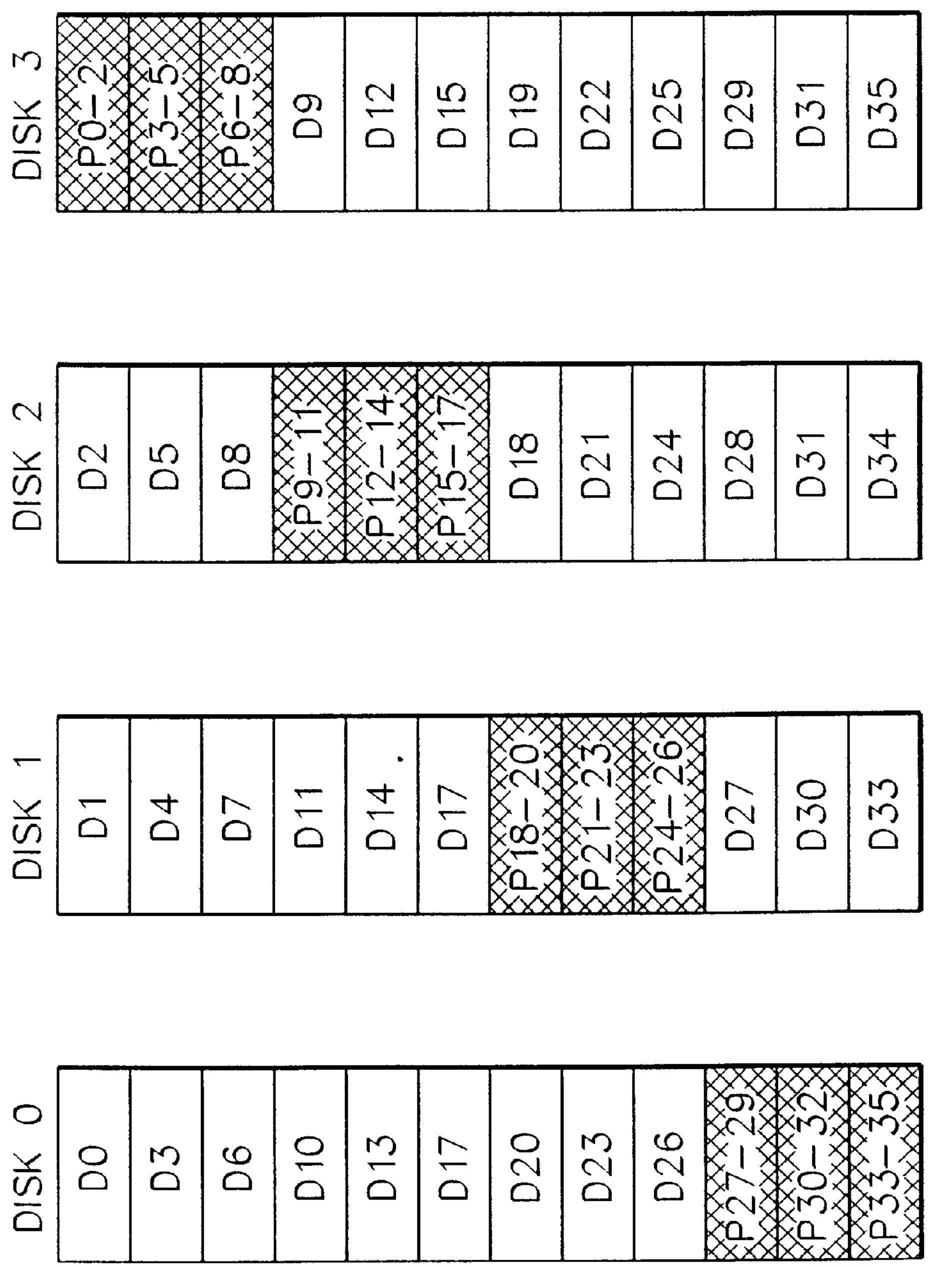
FIG. 12 illustrates a second data layout for one embodiment of the present invention used with a RAID 5 array.

FIG. 12 illustrates one embodiment of a data layout that reduces the penalty for short writes, yet advantageously provides high performance of sequential reads. In this embodiment, smaller stripe sizes are chosen as compared to those selected in FIG. 11, but parity is rotated after an integral number of stripes, rather than after each stripe. Thus, parity data may be written in blocks composed of a substantially integral number of stripes. The number of stripes in a block may vary from zone to zone so as to improve sequential the sequential read performance of the drive and the array. The total contiguous parity information is chosen to be substantially equal to a SkipSize to maintain improved sequential read performance. That is, the points where there is substantially no waiting between stripes.

Furthermore, using smaller stripe sizes means that more writes will update the entire stripe, and hence the update will be faster. In one embodiment, the stripe size can be reduced all the way to the point where the stripe size is less than one track or even to just one sector, such as a 512 byte sector. In another embodiment, an intermediate stripe size, which may be, by way of example, equal to a few dozen or a few hundred sectors, can be chosen to match the typical data access patterns. Thus, by way of example, for single user systems, a large stripe size may be selected, while for a multi-user system, relatively smaller stripe sizes may be selected.

In the example illustrated in FIG. 12, the parity block size is equal to 3, and the parity block is rotated to a different disk every fourth stripe.

In one embodiment, a user may be offered the opportunity to select one or more stripe sizes via a prompt or other user interface. However, it is possible that the stripe size selected by the user may not divide evenly into the SkipSize associated with a given zone. In such a situation, software, which may be host-based software or controller firmware, may optionally pick a stripe size that is close to the requested stripe size. For example, assume the user requests a stripe size of 32 Kbytes (64 sectors) and the zone has 397 sectors per track. If the first SkipSize, which may be 397, is selected, the SkipSize cannot be divided into an integral number of 64 sector blocks. In one embodiment, the requested SkipSize may be incremented by the software so as to be divisible by the selected stripe size, with little drop-off in performance. However, it may be less desirable to just round up the SkipSize to the nearest 64 because that may move it far from peak performance, that is, far from the point where there is substantially no waiting period. In this example, it may be preferred to increase the SkipSize to a number with more factors, such as 400, and pick a stripe size that is divisible into that number an integral number of times, such as 50 or 80 sectors.

In one embodiment, the complexity of selecting appropriate intermediate stripe sizes can be reduced or avoided altogether by restricting configuration options to selecting for increased or best write performance. Thus, for example, a user, utility, or application program communicating with the RAID 5 array software may be allowed to choose between using a given small block size for improved random read performance or a given large block size for improved sequential write performance. In one embodiment, the user or other program would not actually select the size of the block, but would instead select between improved random read performance and improved random write performance.

For example, to select for increased write performance, if the selected stripe size=512, the block size is determined by the SkipSize. To select for increased random, as opposed to sequential, read performance, it may be desirable to select the stripe size so that each of the drive arrays are seeking different disk locations. To accomplish this, it may be desirable to select the first SkipSize as the stripe size. This provides a fairly large stripe size equal to approximately one track, while allowing each drive to efficiently seek to different locations. In many drives, the rotation time of the disk is comparable to the seek time. If the selected stripe size is approximately equal to one track, then the stripe size=block size=SkipSize. In another embodiment, the block size is equal to an integral number of stripes, where the integral number is greater than one. In still another embodiment, the block size is equal to an integral number of stripes, and the product of the selected stripe size and block size substantially equals one track.

The following algorithm may be used for determining and evaluating the performance provided by different stripe sizes. The algorithm measures the transfer rate performance from one drive while reading N−1 consecutive data stripes, and then skipping one parity stripe. The exemplary algorithm repeats the measurement for 500 stripe sizes, varying in size from 2 LBAs to 1,000 LBAs, though other sizes of stripe may be tested as well.

```
/* Finds transfer rate for N drive RAID 5 array by reading
   N−1 stripes, then skipping one (parity) stripe. Repeat
   for 500 different stripe sizes.*/
Get StartingLBA, Drives from command line /* The
   number of drives will range from 3–8 in this example*/
   MeasureStripe
   For Stripe=2 LBAs to 1000 LBAs by 2
      Start timer
      Raid5Read(Stripe)
      Stop timer
      Print stripe size and timer
Raid5Read(Stripe)
   i=StartingLBA
   While i<StartingLBA+10 MB
      Read from i to i+Stripe *(Drives−1)−1
      i=i+Stripe* Drives
```

The algorithm first receives from as a user input or from a file the number of drives in the array and the starting LBA where the profiling will begin. A stripe size is selected and a timer is started. The stripe is read, and the timer is stopped. The stripe size and the timer or elapsed time is output, either to a screen, a printer, or to a file. The process may be repeated using the same stripe size until a certain amount of data, such as 10 Mbytes or a full zone, is read. The process is repeated using different stripe sizes.

Figure 13:
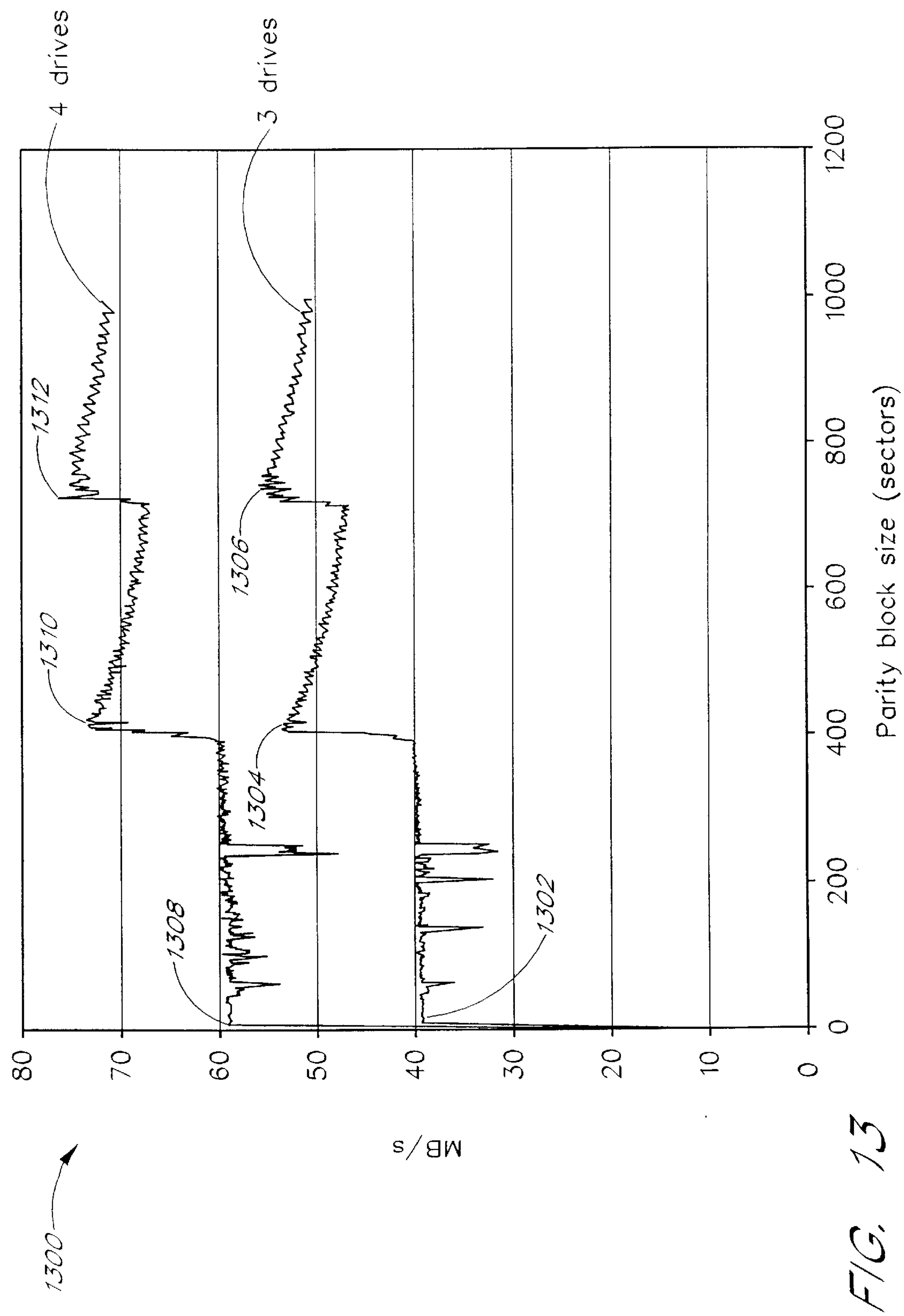
FIG. 13 illustrates a graph demonstrating the performance advantages of one embodiment of the present invention as compared with conventional systems.

The results of performance evaluations of different drive array sizes using the following algorithm are illustrated by a graph 1300 in FIG. 13. In this exemplary evaluation, the stripe size is varied from 2 to 1000 sectors, with the read performance measured for each stripe size. The three-drive simulation measures the data read from one drive, and multiplies the read performance by three. Similarly, the four-drive simulation measures the data read from one drive, and multiplies the read performance by four. The left side of the graph 1300 illustrates the typical performance of conventional RAID 5 techniques using small stripe sizes. The performance of these conventional techniques is flat at a sustained rate of N−1 times the performance of one drive. Thus, using conventional techniques, 64 Kbyte stripes are used to read data from an array of an exemplary 9.1 Gbyte drives. For a three drive array, the read performance at point 1302 is approximately 39 Mbytes/second. For a four drive array, the read performance at point 1308 is approximately 59 Mbytes/second.

One embodiment of the present invention provides significantly improved performance using the same physical drives, as compared to the conventional techniques. Thus, in one embodiment, SkipSizes may be determined which will reduce the time needed to skip over parity data. Different zones may have different sets of SkipSizes. The peaks 1304, 1306, 1310, 1312 in the graph 600 correspond to the desirable or optimal SkipSizes for one profiled zone. One embodiment of the present invention operates using at least one of these corresponding SkipSizes. If the first SkipSize, which in this example is 206 Kbytes, is chosen for the three drive array, the three-drive array provides 53 Mbytes/second read performance. Thus, using by using the first SkipSize, a 36% improvement in read performance is achieved relative to the 39 Mbyte/second performance of a conventional array. If the first SkipSize is chosen for the four drive array, the four-drive array provides 72 Mbyte/second read performance. Thus, by using the first SkipSize, a 22% improvement in read performance is achieved relative to the 59 Mbyte/second performance of a conventional array. The amount of performance improvement in general may depend on the particular type of drive or drives used, the zone being read from, and the SkipSize chosen.

In one embodiment of the present invention, the theoretical limit of performance improvement is 50% for three drive arrays, and 33% for four drive arrays. The limit is not reached in the preceding examples because one extra disk skew is used when skipping past the parity block, and this penalty is spread across one track's worth of data transfer. The later peaks 1306, 1312 of the graph, which correspond to other SkipSizes, incur the same penalty, but transfer more data, thus reducing the average penalty per byte transferred. A larger SkipSize can be chosen to approach the limit more closely. On the other hand, using a larger SkipSize may result in concentrating parity traffic on one drive, and that drive may limit overall performance.

Array drives which are of the same model and have the same formatting may have substantially the same SkipSizes, and the substantially the same parity block sizes for a given zone. Array drives which are formatted differently may have different SkipSizes, and therefore different parity block sizes for a given zone.

FIG. 14 illustrates an exemplary zone table 1400 which may be used with the novel improved RAID 5 system described above. For each disk zone, the table 1400 records the beginning logical block address (LBA), the Block Size, and the Stripe Size. When a disk access is to be performed, the software does a binary search of the zone table 1400 to map the requested LBA to a zone table entry. The offset into the zone is computed by subtracting the beginning LBA from the requested LBA. The disk to be accessed can be determined by dividing the offset by the product of the stripe size and stripes per block modulo the number of drives. Thus, the binary search may be performed using the following algorithm:

Repeat=BlockSize*(Drives−1)*Drives

DataDrive=DLookup((LBA−BeginLBA)mod Repeat)

=(LBA−BeginLBA)mod Drives

ParityDrive=PLookup((LBA−BeginLBA)mod Repeat)

where:

- Repeat is the number of data blocks which will be written before one parity block cycle is complete;
- Drives is the number of drives in the array;
- LBA is the desired logical block address;
- BeginLBA is the address of the first logical block address in a given zone;
- DLookup represents a data drive lookup table, such as that illustrated in FIG. 14;
- DataDrive is the number of the drive which gets the next access;
- ParityDrive is the number of the drive where the next parity block is stored; and
- PLookup represents a parity drive lookup table.

By way of illustration, referring to FIG. 12, there are four drives, and the block size is three. The first parity block is located on Disk 3. Using the above algorithm, Repeat is equal to (3(−1)×4) which is equal to 36. That is, after 36 data blocks and the corresponding parity blocks are accessed, the pattern will repeat. Thus, parity for the $37^{th}$–$40^{th}$ data blocks will once again be accessed using Disk 3.

Assuming that the desired LBA is 37, and the BeginLBA is 0, DataDrive is equal to DLookup((37-0) mod 36) which is equal to ((37-0) mod 4), which is equal to 1. Thus, LBA 37 is located on Drive 1. Similarly, ParityDrive is equal to PLookup((37-0) mod 36), which, in this example, would be Drive 3.

The performance of this algorithm can be increased by substituting table lookups for some of the multiply or divide steps. It may also be desirable to precalculate these computations for the next sequential address. Caching the precomputed addresses allows the address computation to be overlapped with the data transfer of the previous block.

In one embodiment, a performance enhancing stripe size is determined for each disk zone. Preferably, the stripe size determination is performed in a reasonable amount of time. One embodiment of a system and method is described which empirically and efficiently determine desired stripes sizes. The described technique can be generally used on many conventional disk drives.

There are two steps to determining the desired performance enhancing stripe size. First, zone information, such as that found in zone tables, is obtained. While the manufacturer may encode such zone information on the drive, the encoded zone information is generally not available or retrievable by others. However, such zone information may be obtained empirically using one embodiment of the present invention.

As described below, once the zone information is obtained, a performance enhancing stripe size is determined or calculated for each zone. In one embodiment, an algorithm used to determine the performance enhancing stripe sizes measures data access times using different stripe sizes.

One embodiment of a novel technique used to obtain zone information will now be described. Generally, the technique measures read performance across the disk. As described below, the read performance may then be used to determine the location of the disks zones.

Figure 17:
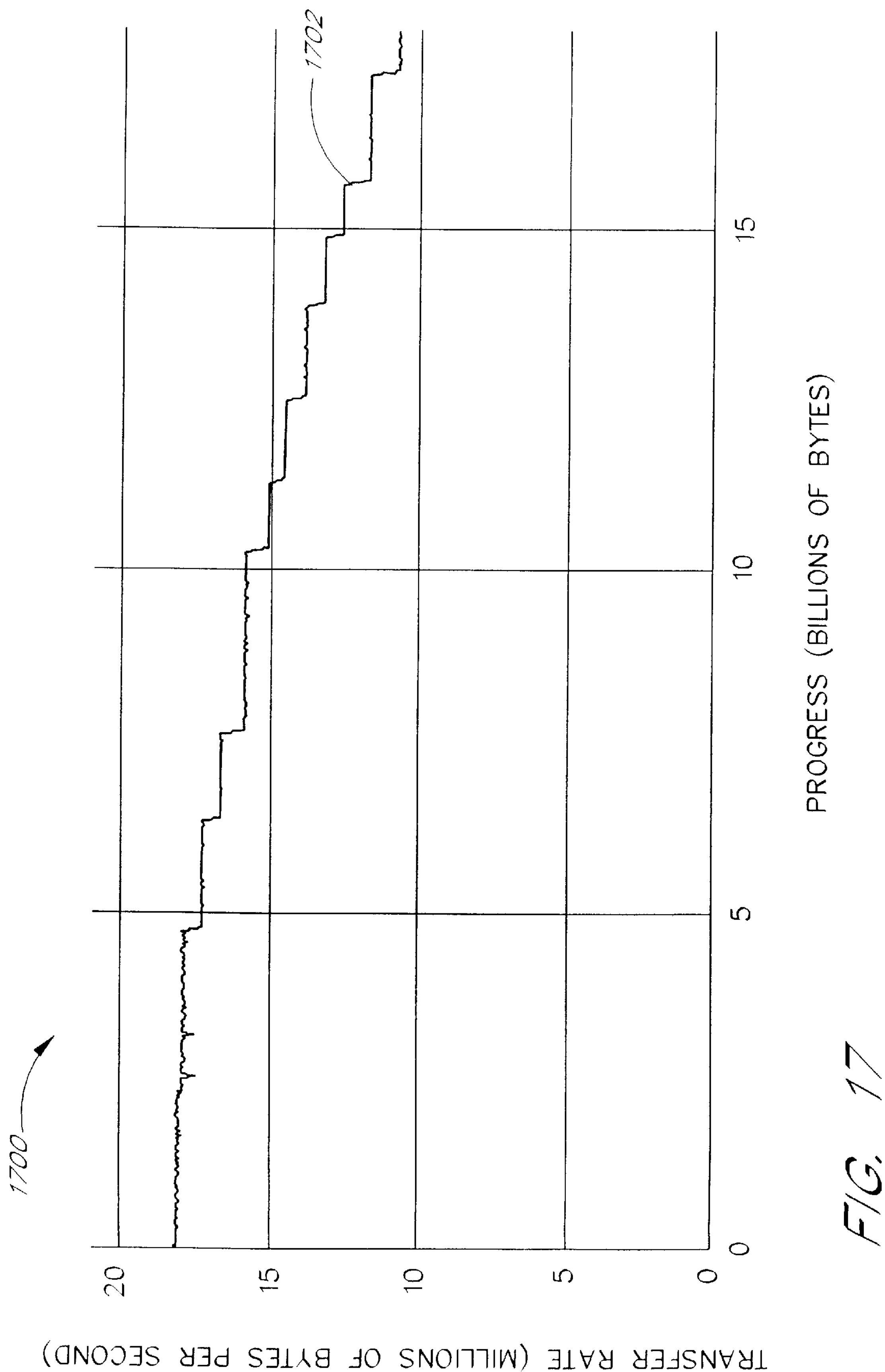
FIG. 17 illustrates a graph depicting the measured data transfer performance of different disk portions.

In one embodiment, the read performance is measured at regular intervals across the disk being characterized while reading from the outer diameter to the inner diameter of the disk, as depicted by the graph 1700 illustrated in FIG. 17. Preferably, the selected sample size is large enough to reduce or minimize the effect on the read performance which may be caused reading of bad sectors which are remapped, causing read performance measurement anomalies. Furthermore, it may be advantageous to use a sufficiently small sample size so that the disk can be sampled in a reasonable amount of time. By way of example, a sample size of 1 Mbyte may be chosen. However, in another embodiment, a sample size of between 512 Kbytes and 10 Mbytes may be chosen. In still another embodiment, samples sizes less than 512 Kbytes, or greater than 10 Mbytes in size may be selected.

In the present example, a selected sample of 1 Mbyte will be used to locate the zones on a 24 Mbyte disk drive. First, 1 Mbyte data reads are performed at 10 MB intervals on the 24 GB disk. This yields 2400 read performance data points. These data points may be plotted or graphed. A curve fitting algorithm may be used to plot a curve or line, such as line 1702, using the data points. The curve may be smoothed. One technique that may be used to smooth the curve uses a moving average scheme. The measured value at each point may be replaced by the value of the point averaged with its neighboring points. The number of points used to perform the averaging will be greater if a smoother curve is desired, or less if a less smooth curve is acceptable. In one embodiment, a given data point is averaged with its 4 nearest neighbors (5 points total), though different numbers of points may be used as well, as described below. The absolute value of the first derivative for this set of points is calculated. The set of relative maxima provides an estimate or approximation of the zone break locations.

Figure 15:
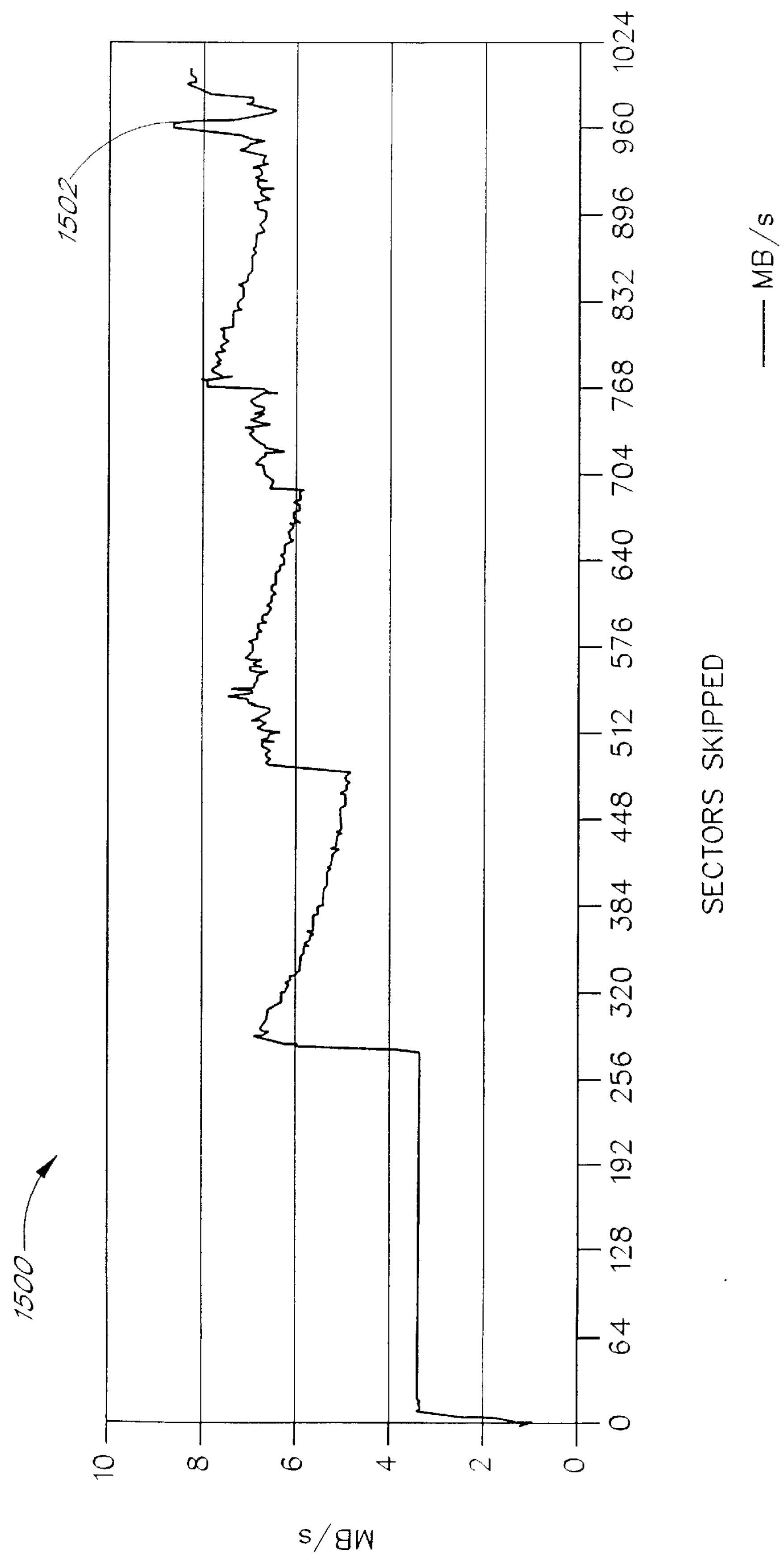
FIG. 15 illustrates a graph depicting the measured data transfer performance with respect to various stripe sized.
Figure 16:
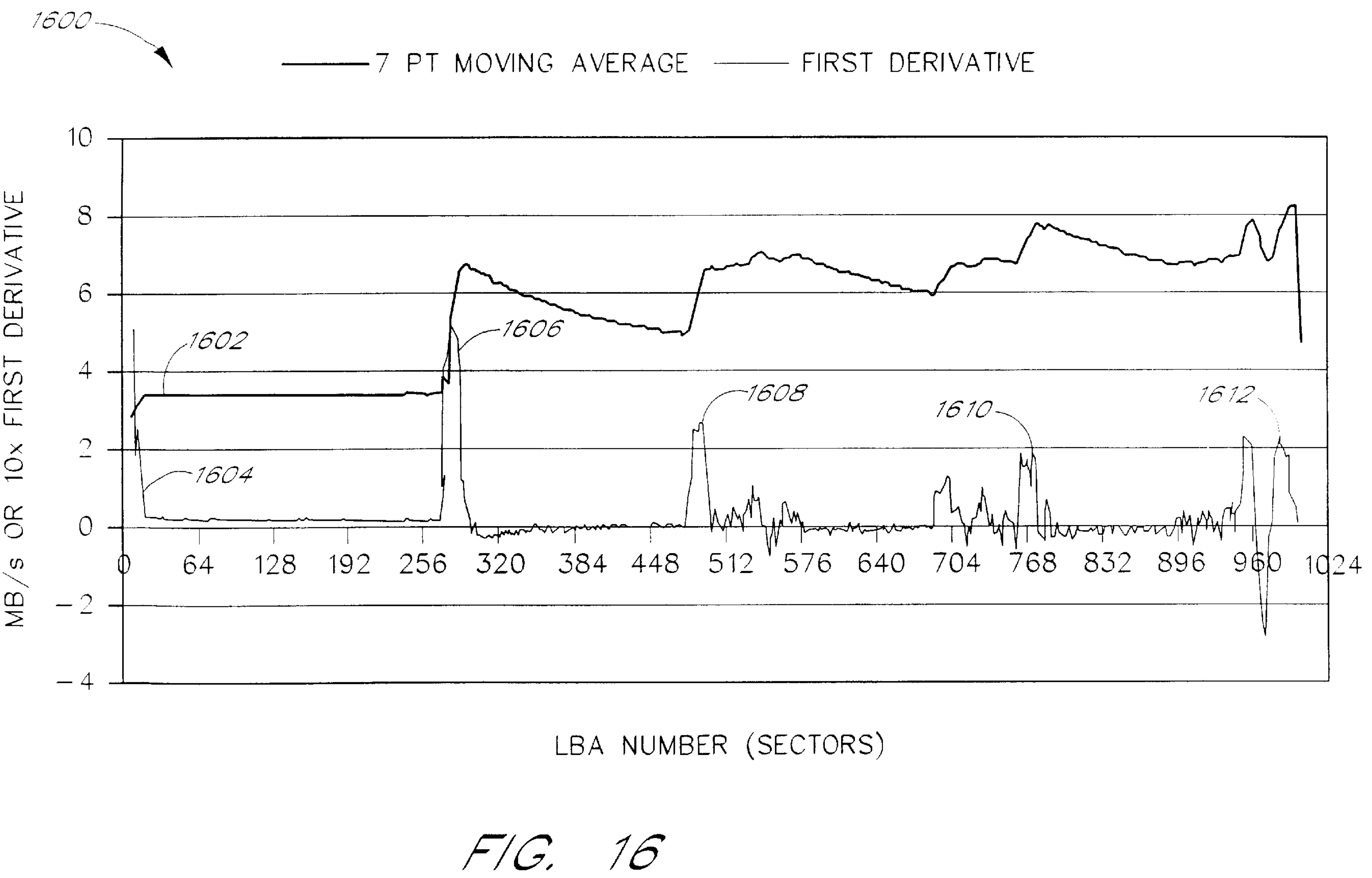
FIG. 16 illustrates a graph depicting the data from the graph illustrated in FIG. 15 after processing.

As discussed above, it may be desirable to average fewer or more neighboring points to smooth the performance curve. For example, FIG. 15 depicts a graph 1500 which plots the raw data transfer rate versus stripe size within a single zone of a Western Digital drive using plotted curve 1502. FIG. 16 depicts a graph 1600 that illustrates an exemplary smoothed curve 1602 of the curve 1502 illustrated in FIG. 15 using a 7 point moving average, rather than a 5 point moving average, as well the corresponding graphed first derivative 1604. The relative maxima or peaks 1606, 1608, 1610, 1612 indicate the approximate location of the initial four zone breaks.

One technique which may be used to better determine the zone break locations will now be described. Using the estimated zone breaks determined using the technique described above, for each estimated zone break, the location of the zone break may be narrowed by reading a predetermined amount of data above and below the estimated zone breaks. For example, 10 Mbytes below each estimated zone block and 10 Mbytes above each estimated zone block may be read using consecutive 1 Mbyte data samples, rather than sampling 1 Mbyte samples at 10 Mbytes intervals as described above. The read performance may be plotted, with the resulting curve smoothed using the averaging technique described above. The absolute value of the first derivative for the averaged set of points is calculated to determine the maximal point, as previously described, yielding a more accurate determination of the zone break. This process may be repeated for each estimated zone break to as to better determine the zone breaks for all or a selected portion of the disk.

In one embodiment, one benefit of determining the zone breaks empirically is that it accounts for zones which may be of poor quality, that is, zones whose performance varies greatly over different parts of the zone.

Once the zone breaks have been determined, the following technique may be used to determined the desired, performance enhancing stripe sizes. A data block, which may be, by way of example, 1 MByte in size, is read from a portion of a given zone. In one embodiment, the data block is read from approximately the middle of a zone using a first stripe size. The read performance is monitored and measured. The read process is repeated using one or more other stripes sizes. For example, the 1 MByte data block may be read using 100 different stripe sizes, and the performance of each read operation may be measured. In one embodiment, the stripe size offering the best, substantially the best, or better than average read performance may then be selected for use.

Another embodiment of the present invention may be configured to provide constant rate disk streaming while maintaining at least a minimum desired data rate using the variable striping technique described above. Constant rate variable streaming provides significant advantages for multimedia applications, such as audio and video (AV) applications. For example, by providing constant rate streaming with at least a minimum desired data rate, better and more reliable audio and video playback may occur.

As described in greater detail below, in one embodiment of the present invention, standard drives may be used in a drive array used to store multimedia information. Data is, however, advantageously arranged to allow the array to supply data at a substantially constant data rate instead of at higher rates at the outer diameter (OD) than at the inner diameter (ID). In one embodiment, the drive array has an even number of drives, though and odd number of drives may be used as well. Data is striped across 2 or more drives in the array, with the stripe size varied so that the stripe size is larger at the outer diameter (OD) and smaller at the inner diameter (ID). Drives in one subset of the array drives, which may be the even numbered drives, are accessed sequentially in the conventional fashion from the outer diameter to the inner diameter. Drives in another subset of drives, which may be the odd numbered drives, are accessed from ID to OD using a novel method that uses knowledge of the track size.

Using this novel method, blocks of data are sized to reduce or eliminate rotational latency when seeking from the end of one block to the beginning of the block preceding it in LBA space. That is, the block sizes are selected so as to reduce or eliminate rotational latency which could occur when seeking backwards, from a block located towards the inner diameter side of a zone to access a block located towards the outer diameter size of the zone.

As previously discussed, FIG. 17 shows the measured data transfer rate on a typical disk when reading sequentially from the outer diameter towards the inner diameter. For this disk, the data transfer rate at the OD is about 18 MB/s and the data rate at the ID is about 10.5 MB/s. If two of these disks were striped using a conventional RAID 0 algorithm, the data rate would start at 36 MB/s, but would disadvantageously drop to just 21 MB/s. Thus, using a conventionally striped array, the data transfer rate can vary by a ratio approaching $3/2$ or even greater.

However, many applications, such as video editing, need a minimum data rate in order to produce a stream of display data at a constant frame rate. If conventional striping is used, either the frame rate is limited to the lowest transfer rate across the drives, or some capacity is lost at the end of the drives.

Because of the need to maintain a minimum data transfer rate, it may be desirable to stripe the fast portion of a first array drive with the slow portion of second array drive in order to maintain a transfer rate at or above the minimum desired transfer rate. Furthermore, in one embodiment, a constant or substantially constant data rate across the striped set may be provided. For example, the data rate may be maintained to vary only 30%, 20%, 10% of less, as desired. Unfortunately, conventionally drives are formatted to read efficiently in the forward direction, but not in the reverse direction, and so do not ensure that at least such a minimum and/or constant data rate is provided for the purposes of multimedia data accesses.

One approach to providing a more constant data rate may involve dividing the disk data space into several regions, where, due to the their location on the disk, some regions will have a faster transfer rate than others. One may then read the fast region of one drive simultaneously with the slow region of another drive. However, two significant problems may arise with this approach. If the regions are large, with, for example, just 3 regions per drive, if one drive reads its outer region while the other drive reads its inner region, data rates may be somewhat averaged, but both drives will be reading the end, or inner diameter sectors, of their regions at the same time. Hence the difference in data rate at the beginning and end of the region can still be substantial, lowering the worst case data rate by as much as 20% or more. A second problem occurs when switching between regions. Assume drive A reads regions R0 then R1 then R2, while drive B reads R2 then R1 then R0. When drive B finishes reading R2, it must seek past $2/3$ of the disk to get back to the beginning of R1. This seek, plus the rotational latency, may cause a momentary glitch in the data stream. The same problem occurs when going from the end of R1 back to R0. If the number of regions is increased, the first problem may be somewhat reduced, but the second problem will not be corrected. In addition, if very small regions are picked, the average data rate drops sharply because the drive must seek much more often. A single small region size will not provide an optimal data rate across the whole drive.

One embodiment of the present invention provides superior performance for sequential reads then the technique just described. As previously discussed, in contrast to conventional systems, one embodiment of the present invention provides a novel way of accessing a disk from the outer diameter to the inner diameter at substantially the same data rate as accessing from ID to OD. In addition, a variable stripe size is provided across at least a pair of drives, to thereby ensure that the data rate for at least a portion of the data does not fall below a desired minimum data rate.

Thus, the present striping architecture is particularly useful for audio-visual (AV) and multimedia applications. In one embodiment, the stripe size is varied from OD to ID, and a reverse-access block size is determined by the number of tracks in that zone.

In addition, one embodiment of the present invention utilizes zone information to select a block size for reading a disk from OD to ID with enhanced performance. A method and a system are also provided for profiling the performance of a disk drive. The profiling information may then be used to set the stripe size and reverse-access block size for each zone so as to provide enhanced or optimal performance.

One embodiment of the present invention will now be described in greater detail. As discussed above with reference to the mirrored disk embodiment, the performance of a mirrored disk array may be improved by transferring a portion of the data from both disks at substantially the same time. In one embodiment, the enhanced performance is achieved in part by recognizing that it is possible for a drive to skip ahead without incurring the full penalty of waiting for the drive to rotate past all of the data being skipped.

However, instead of skipping forward, as described above, one embodiment of the constant streaming embodiment skips backwards with minimal performance penalty. The disk profiling techniques described above can also be used to profile the performance of a disk when reading backwards at varying block sizes. The resulting profiling information can be used to determine an optimal block size which provides enhanced transfer rates. The optimal block or a block size which provides enhanced transfer rates may then be used. As with the mirrored disk array, the optimal block size may be different for each zone of the disk. Hence, in one embodiment, the block size for each zone is stored in a zone table or is derived from the other information in the zone table.

Figure 18:
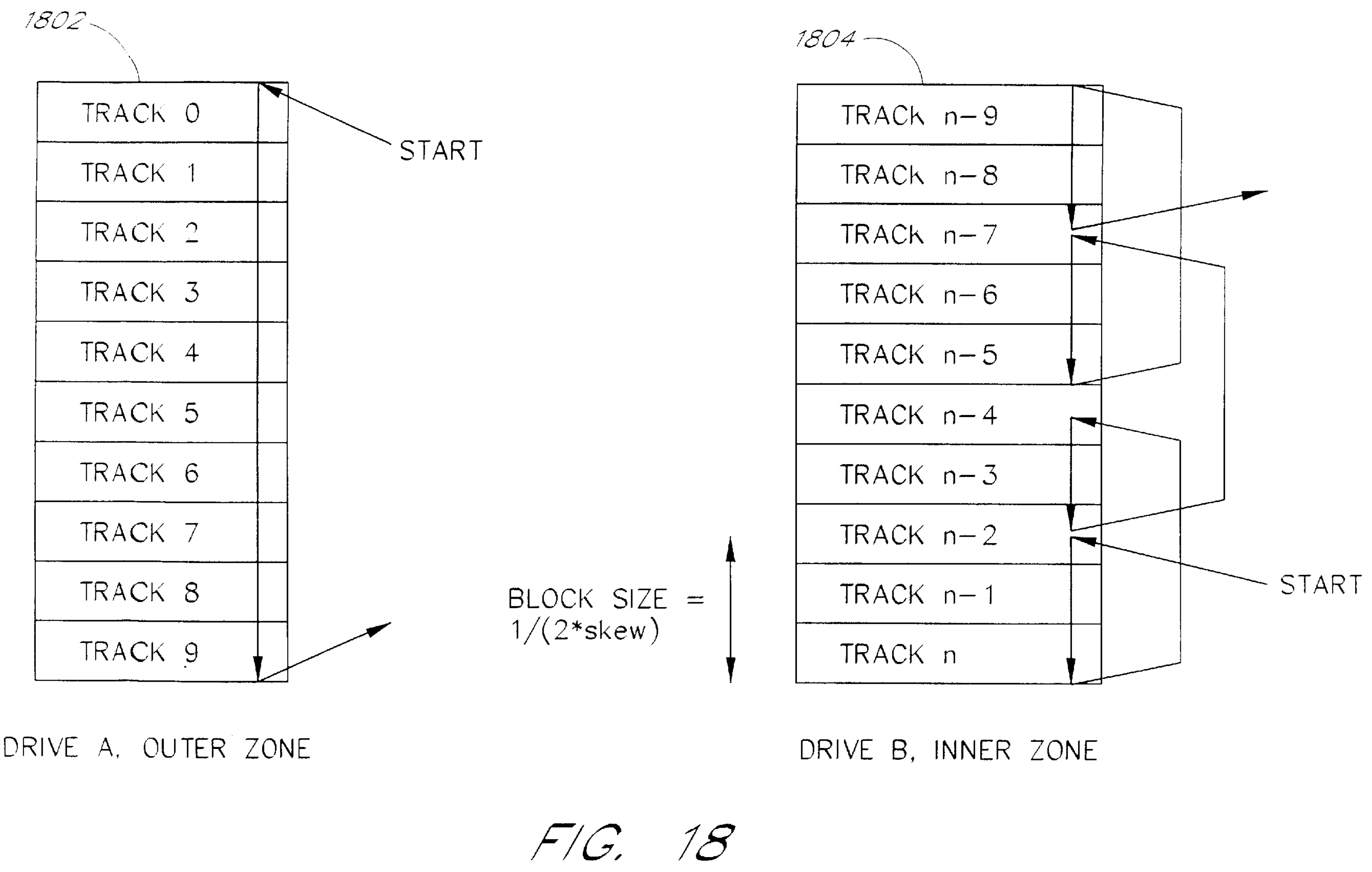
FIG. 18 illustrates one embodiment of accessing data on a two disk system.

FIG. 18 illustrates one technique for the address mapping of two drives, with Drive A 1802 reading forwards while Drive B 1804 is read backwards. The diagram depicts an exemplary access of 10 tracks. For this example, the striping is selected such that the same numbers of tracks are read from both drives. Additionally, in this example, Drive A 1802 is being read from tracks located towards its the outer diameter. Therefore, in the illustrated example, the tracks being read from Drive A 1802 during this access are larger than the tracks being read from Drive B 1804, whose tracks are being read toward its inner diameter.

The desired or optimal block size to be used for the access from Drive B 1804 is sized such that the backward jump does not incur extra or substantial rotational latency. That is, once the backward jump is completed, the disk head is over the beginning of the desired sector. In this example, a block size of 2½ sectors has been chosen, and the backward jump then traverses 5 tracks. If the track-to-track data skew on the disk is ⅕ or 0.2 of a revolution, then the backward jump over 5 tracks will be the same as reading forward to the next track.

In some instances, the backward jump may only involve a head switch, and no seek may be needed. In other instances, a backward seek is needed. However, even when a backward seek is performed, the backward seek may be no longer than a comparable forward seek that may have been required to get to the next track. Thus, as compared with a comparable forward seek, a performance penalty is not incurred. If the skew is known, the optimal block size can be set by the formula Block=1/(k*skew), where k is a constant which may be equal to, by way of example, 2. Thus, if, as in the example above, the skew is equal to 0.2 disk revolutions, then the desired block size for the reverse or backward access is 1/(2*0.2) which is equal to 2.5. If the skew is not known, backward reads can be performed with varying block sizes to find the fastest transfer rate. One embodiment of an algorithm used to determine a desired block size is illustrated in FIG. 19.

The algorithm 1900 illustrated in FIG. 19 first receives a start LBA StartingLBA, which specifies the disk location for which the block size is to be determined. The start LBA may be provided by an operator entering the value on a command line, or may be a predetermined value provided by another program. Once the start LBA is know, the algorithm 1900 selects a first block size, starts a timer, and then performs a backward read using the selected block size. Once the read is performed, the timer is stopped, and the read performance, in terms of the total time for the read operation for the selected block size, is printed. The process is repeated in this example 500 times using blocks ranging from 2 sectors to 1,000 sectors in intervals of 2 sectors. The desired block size may then be selected based on the performance measurements. In one embodiment, the block size providing the best read performance may be selected. The reverse access or backward read AVRead module reads backwards, starting at the start LBA minus the selected block size, until the start LBA is reached.

One embodiment of a possible zone table arrangement 2000A which may be used with the present invention is illustrated in FIG. 20A. An extra field may be added, as compared to the zone table illustrated in FIG. 5A, to indicate the block size RevBlockSize to be used when performing a reverse access in the corresponding zone. This field may be omitted if other fields in the zone table give sufficient information to determine the skew (and hence the reverse access block size) for that zone.

FIG. 20B illustrates an exemplary algorithm 2000B which may be used to remap the original LBA space into a blocked reverse address space. In one embodiment, the disk LBAs are renumbered from the inside LBA, located at the disk's inner diameter, to the outside LBA, located at the disk's outer diameter. The remapped reverse access LBA, NegLBA, is calculated by subtracting the requested LBA, ReqLBA, from the maximum LBA, MaxLBA. In one embodiment, reverse access requests that would cross zone boundaries are broken into separate requests so that each separate request falls within a zone. Each separate request is then queued as a separate I/O request. When a request LBA is received, the remapped LBA, NegLBA, is calculated. Using the address, NegLBA, the corresponding reverse access block size is located using the zone table 2000A in the RevBlockSize column. The block number, which will be used to access the remapped block, may then be calculated by dividing the value of NegLBA by the block size and taking the integer value. The offset is calculated by taking the remainder of the division of the value of NegLBA by the block size, subtracting 1 from the remainder, and then subtracting the result from the block size. The remapped LBA, RemappedLBA, is then set equal to the value of BlockNum combined with the offset value.

Figure 21:
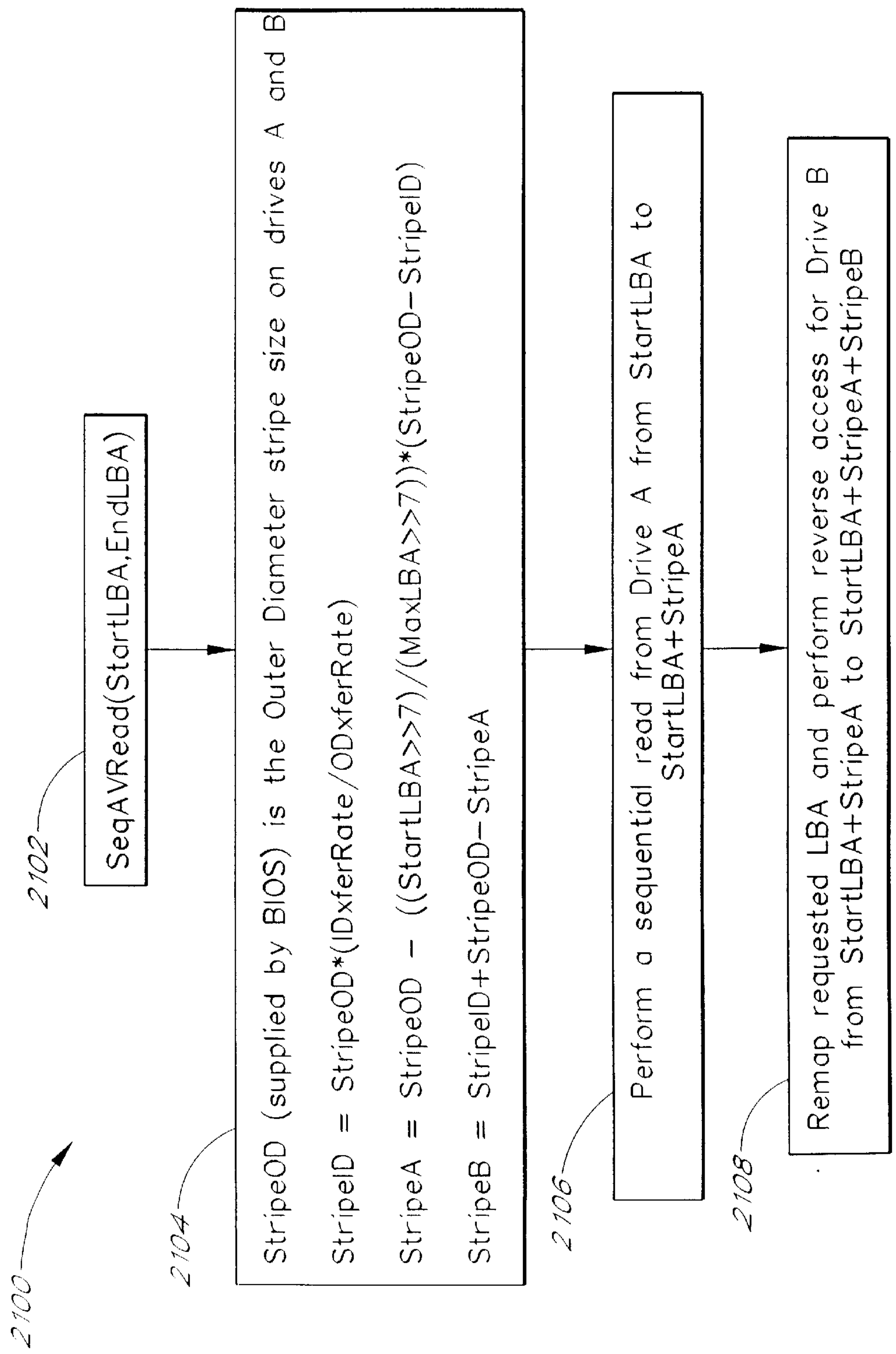
FIG. 21 illustrates an embodiment of a read algorithm for reverse access reads.

FIG. 21 illustrates a high level flowchart for an exemplary sequential read of data, such as audiovisual data. A similar algorithm may be used for a sequential write. The stripe size is determined at state 2102. An efficient approach is taken wherein the stripe size is linearly varied when read from the outer to the inner diameter, with the endpoints determined by the ratio of read performance at the OD and ID. In one embodiment, there are the same number of sectors/track in both the innermost zone and the outermost zone. In one embodiment, each block size may be associated with an range of logical block addresses. In the illustrated embodiment, a shift right by 7 bits is made in the computation. This makes the stripe size the same for all accesses within each 64 K space. The shift may be set to the size of the maximum I/O (max distance between StartLBA and EndLBA), and assumes that I/Os that are not aligned to these boundaries are broken into smaller requests by higher level software before calling this routine. This advantageously ensures that accesses to the same address use the same stripe size.

In another embodiment, rather than utilizing the linear approach described above, striping may be varied only at zone crossings. This technique allows the data rate to be somewhat more constant, however, at the cost of a more complex algorithm needed to determine the stripe size.

In one embodiment, the stripe size for the out diameter is received from the computer BIOS, from an operator, or from a previous disk profiling operation.

Once the stripe size is determined, separate requests are sent to the drives. A normal sequential request is sent to one drive, and a reverse request is sent to the other drive.

Figure 22:
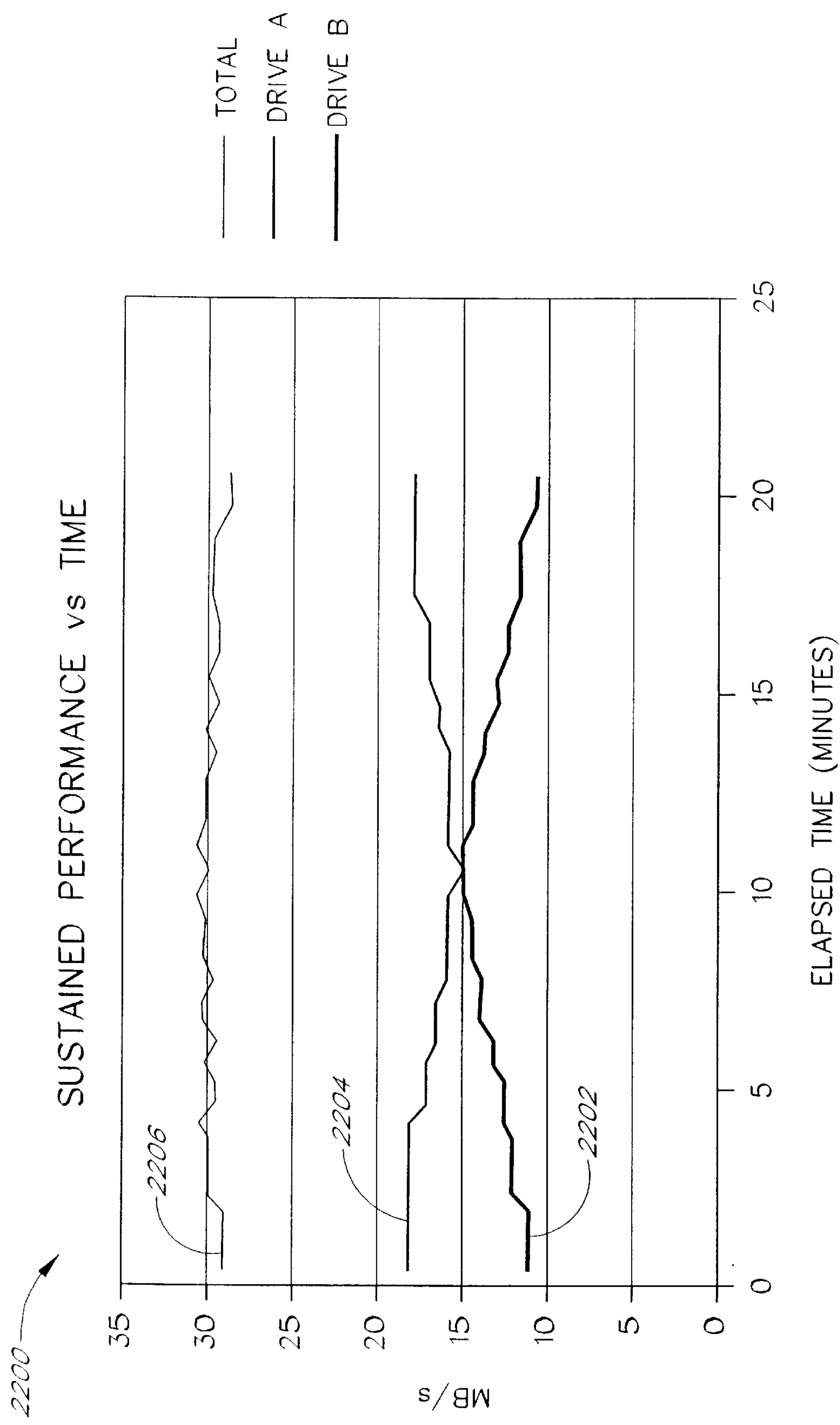
FIG. 22 illustrates a graph depicting the sustained data transfer performance for a drive array using one embodiment of the present invention.

FIG. 22 depicts a graph 22000 which illustrates the predicted performance while striping two 18 GB drives in a disk array using the algorithm illustrated in FIG. 21. The performance of Drive A is graphed by line 2204, the performance of Drive B is graphed by line 2202, and the total performance is graphed by line 2206. Though the performance of Drives A and B vary significantly, the average data rate advantageously stays fairly constant and remains above 28 MB/s. By contrast, using conventional striping, the array performance would drop to just 21 MB/s at the inner diameter.

Figure 23:
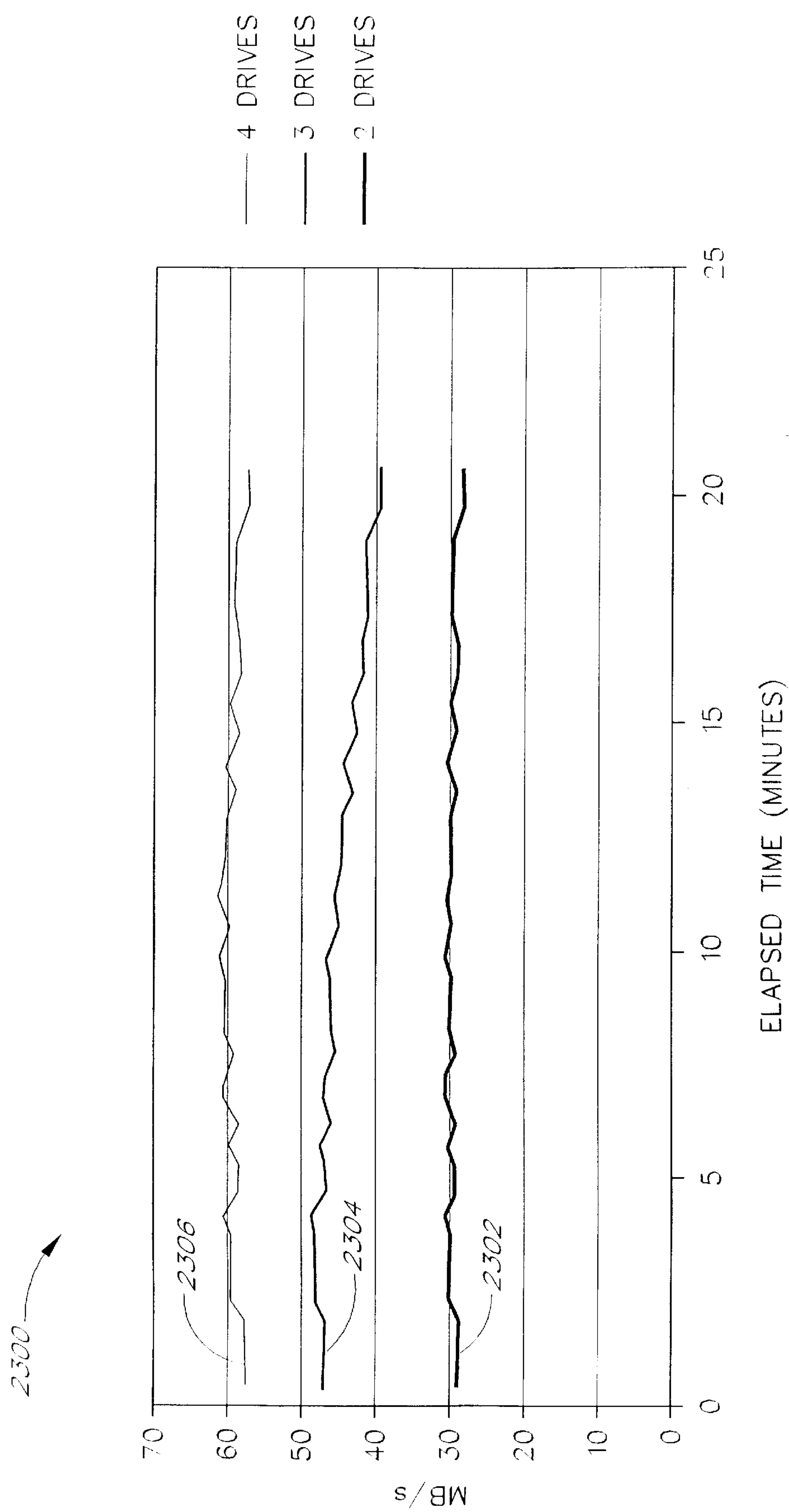
FIG. 23 illustrates a graph depicting the data transfer performance for different exemplary drive array configurations.

FIG. 23 depicts a graph 2300 that illustrates the performance of 2, 3 and 4 drive system using the striping technique described above. In one embodiment, using an even number of drives provides a more constant transfer rate than an odd number of drives. In one embodiment of a 3 drive array, two drives read sequentially forward, and one drive reads in reverse. While the fall off in data rate of the extra sequential drive may bring the total array transfer rate down at the inner diameter, the transfer rate does not fall nearly as low as if all 3 were reading sequentially as in conventional systems.

Thus, as described above, by varying stripe sizes and arranging data on disks in novel ways, many advantages may be achieved. For example, greatly enhanced sequential disk I/O performance is achieved using a RAID 1 disk array. Furthermore, in a RAID 5 disk array, sequential access performance may be better than (n−1) times the performance of a single drive, where "n" is the number of drives in the array. In addition, one embodiment utilizes reverse accesses to allow a more constant data flow and a higher total transfer rate when reading data, such as multimedia data, from a drive array.

While certain preferred embodiments of the invention have been described, these embodiments have been presented by way of example only, and are not intended to limit the scope of the present invention. Accordingly, the breadth and scope of the present invention should be defined only in accordance with the following claims and their equivalents.

What is claimed is:

1. A method of balancing accesses to mirrored array disks by dynamically selecting which one of at least a first array disk and a second array disk is to service a read request, said method comprising:

monitoring the addresses of at least a portion of read requests prior to receiving a subsequent read request;

calculating an average address of said portion of prior read requests;

designating said first disk as a data source for said subsequent read request, when said subsequent read request is for data located above said average address; and designating said second disk as a data source for said subsequent read request, when said subsequent read request is for data located below said average address.

2. The method as defined in claim 1, further comprising recalculating said average based at least in part on said subsequent read request.

3. The method as defined in claim 1, wherein said dynamic selection is performed to substantially equalize data accesses to said first disk and said second disk for at least a first set of read requests.

4. A method of reducing head movements during accesses to drives within a drive array by dynamically selecting which one of at least a first drive and a second drive is to be used to read data stored within a first logical address range, wherein at least a first set of data is stored in both said first drive and said second drive, said method comprising:

monitoring the logical block addresses accessed by at least a portion of read operations; and designating said first drive as a data source for data stored on both said first drive and said second drive in said first logical address range, and said second drive as a data source for data stored on both said first drive and said second drive outside said first logical address range, said designation performed at least partly in response to said monitoring act.

5. A method of dynamically selecting one of at least two disks to service at least a first read request, said method comprising:

monitoring the addresses of at least a portion of read requests received prior to said first read request;

calculating a median address of said portion of prior read requests;

selecting a first set of addresses based upon at least said median address;

reading data stored at addresses within said selected first set of addresses from a first of said at least two disks; and reading at least a portion of said data stored at addresses outside of said selected first set of addresses from a second of said at least two disks.

* * * * *